(12) United States Patent
Kunori

(10) Patent No.: US 11,991,334 B2
(45) Date of Patent: May 21, 2024

(54) IMAGE FORMING APPARATUS, CONTROL METHOD, AND STORAGE MEDIUM

(71) Applicant: CANON KABUSHIKI KAISHA, Tokyo (JP)

(72) Inventor: Shiro Kunori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 17/507,308

(22) Filed: Oct. 21, 2021

(65) Prior Publication Data

US 2022/0150377 A1 May 12, 2022

(30) Foreign Application Priority Data

Nov. 10, 2020 (JP) ................................ 2020-187610

(51) Int. Cl.
| | |
|---|---|
| *B41M 3/14* | (2006.01) |
| *H04L 9/32* | (2006.01) |
| *H04N 1/32* | (2006.01) |
| *H04L 9/00* | (2022.01) |

(52) U.S. Cl.
CPC .......... *H04N 1/32144* (2013.01); *B41M 3/14* (2013.01); *H04L 9/3236* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 11,212,397 B1 * | 12/2021 | Kosaka | .............. H04N 1/00244 |
| 2019/0340369 A1 * | 11/2019 | Hadi | ...................... G06V 40/33 |
| 2022/0318346 A1 * | 10/2022 | Decoux | ................ G07D 7/0047 |

FOREIGN PATENT DOCUMENTS

JP          2018128823 A      8/2018

* cited by examiner

*Primary Examiner* — Oneal R Mistry
(74) *Attorney, Agent, or Firm* — Canon U.S.A., Inc. IP Division

(57) ABSTRACT

An image forming apparatus that cooperates with a management service and a blockchain service generates, in printing a document stored in the management service, one or more embedded images based on existence proof information and tampering detection information, registers the existence proof information and the tampering detection information with the blockchain service, performs printing of the document with the one or more embedded images embedded therein, and, when verifying a printed product obtained by the printing, performs two verifications indicating that information about the printed product exists in the blockchain service and that there is no tampering in the printed product, by decoding the one or more embedded images included in the printed product to acquire the existence proof information and the tampering detection information and making an inquiry about the existence proof information and the tampering detection information registered in blocks of the blockchain service.

10 Claims, 18 Drawing Sheets

FIG.12

| 1200 | ■ DOCUMENT VERIFICATION |
|---|---|

1201 — The scanned document will be verified. Please set a sheet to be scanned, and then press the "VERIFY" button.

VERIFY

1203

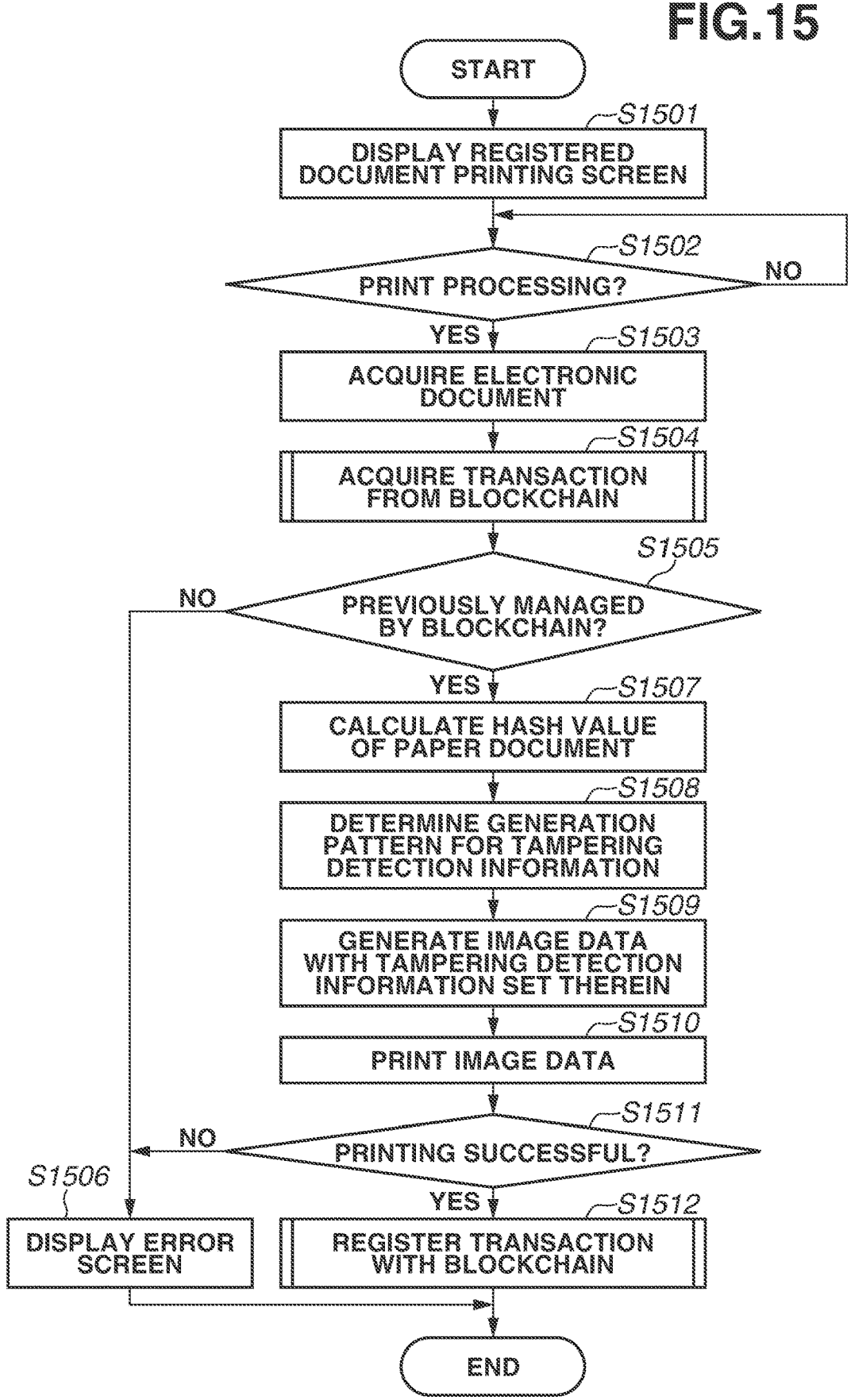

IMAGE FORMING APPARATUS, CONTROL METHOD, AND STORAGE MEDIUM

BACKGROUND

Field of the Disclosure

Aspects of the present disclosure generally relate to a technique to detect any tampering in a paper document obtained by printing an electronic document.

Description of the Related Art

Heretofore, there has been known a technique to prevent unauthorized alteration of an electronic file by registering operation information about an electronic document with a blockchain, such as that discussed in Japanese Patent Application Laid-Open No. 2018-128823.

Using a blockchain as in the technique discussed in Japanese Patent Application Laid-Open No. 2018-128823 makes it clear that a document is registered with a server or ledger and exists in the world, thus enabling an assurance of authenticity of the document (an existence proof indicating that the document is the same as a registered document). However, the technique discussed in Japanese Patent Application Laid-Open No. 2018-128823 has an issue of, while being able to ensure authenticity of an electronic document, not being able to ensure that, in the case of a paper document obtained by printing an electronic document, there is no tampering in the content of the paper document.

SUMMARY

Some aspects of the present disclosure are generally directed to enabling not only giving proof of existence but also verifying the presence or absence of a tampering with respect to a paper document obtained by printing an electronic document in an electronic document management system using a blockchain.

According to some aspects, an image forming apparatus that cooperates with a management service which receives a document via a network and stores the document and a blockchain service which manages information about the document on a block-by-block basis and, upon defining association of each block with a previous and/or subsequent block, manages a plurality of blocks with a plurality of nodes includes a generation unit configured to, in printing a document stored in the management service, generate one or more embedded images based on existence proof information for confirming that information about a printed product of the document exists in the blockchain service and tampering detection information for confirming that there is no tampering in a printed product obtained by printing the document, a registration unit configured to register the existence proof information and the tampering detection information with the blockchain service, a printing unit configured to perform printing of the document with the one or more embedded images embedded therein, and a control unit configured to, when verifying a printed product obtained by the printing unit, perform two verifications indicating that information about the printed product exists in the blockchain service and that there is no tampering in the printed product, by decoding the one or more embedded images included in the printed product to acquire the existence proof information and the tampering detection information and making an inquiry about the existence proof information and the tampering detection information registered in blocks of the blockchain service.

Further features of various embodiments will become apparent from the following description of exemplary embodiments with reference to the attached drawings.

BRIEF DESCRIPTION OF THE DRAWINGS

FIG. 12 is a diagram illustrating an example of a document verification screen, which is displayed on the operation unit, in an exemplary embodiment.

FIG. 15 is a flowchart illustrating processing for performing printing of an electronic document by an image forming apparatus, in an exemplary embodiment.

DESCRIPTION OF THE EMBODIMENTS

In an electronic document management system using a blockchain, an exemplary embodiment provides a configuration capable of not only giving proof of existence but also verifying the presence or absence of a tampering at a time with respect to a paper document obtained by printing an electronic document. One of conceivable methods for the configuration includes previously registering not only an electronic document serving as a source of a paper document but also a hash value regarding the printed content of the paper document with the blockchain and then scanning a paper document targeted for verification to calculate a hash value thereof. Then, the method includes comparing the calculated hash value with a hash value registered with the blockchain to verify the presence or absence of a tampering as well as the authenticity of the paper document.

However, scanning a paper document obtained by printing to calculate a hash value may result in that, due to, for example, a slight inclination of paper during scanning or a crumple or smudge of paper, realistically, the hash value takes different values each time. Therefore, although it is possible to ensure the authenticity of a paper document with use of the blockchain, the method of using a hash value regarding the content of a paper document is not able to surely verify that there is no tapering in the content of the paper document, and is thus not able to ensure a state in which there is authenticity and there is no tampering in the document (e.g., the completeness of the document).

Some aspects of the present disclosure solve this issue by using a method different from the above-mentioned conceivable method. Various exemplary embodiments, features, and aspects will be described in detail below with reference to the drawings.

Figure 1:
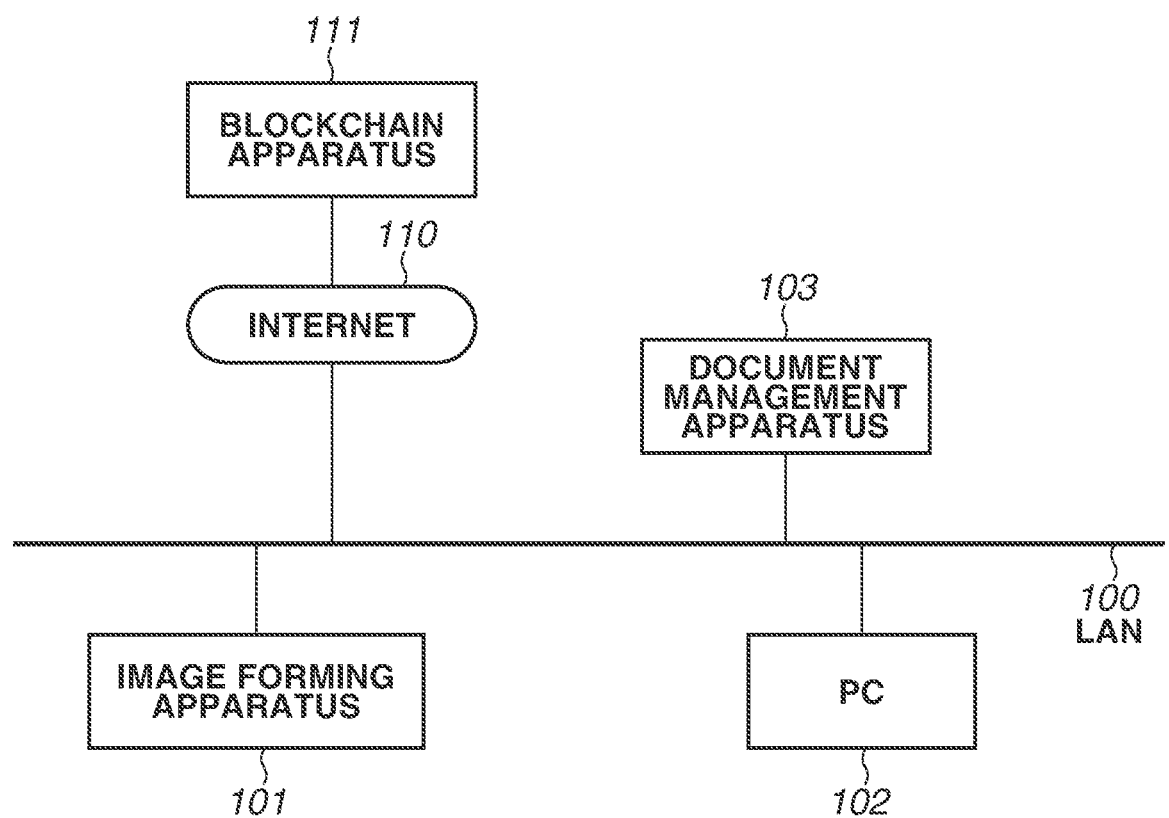
FIG. 1 is a diagram illustrating a configuration of a system in an exemplary embodiment.

FIG. 1 is an overall view of a system associated with an image forming apparatus 101 in a first exemplary embodiment. The image forming apparatus 101, a personal computer (PC) 102, and a document management apparatus 103 are located in an intranet while being connected to a local area network (LAN) 100, and perform communication with a blockchain (BC) apparatus 111 via the Internet 110.

The PC 102 is used to manage the image forming apparatus 101 with use of a web browser and to perform printing with the image forming apparatus 101 with use of a printer driver.

The blockchain apparatus 111 is an apparatus which collectively manages information about electronic documents generated by the image forming apparatus 101 or the PC 102 on a block-by-block basis and is thus an apparatus which provides a blockchain service for insuring the validity of each document. The document management apparatus 103 is an apparatus which stores an electronic document generated by the image forming apparatus 101 or the PC 102 and is thus an apparatus which provides a document management service. A service which the blockchain apparatus 111 and the document management apparatus 103 provide can be provided as a cloud service, and, in that case, a configuration in which one apparatus obtained by virtualizing a plurality of computers provides a service can be employed.

Figure 2:
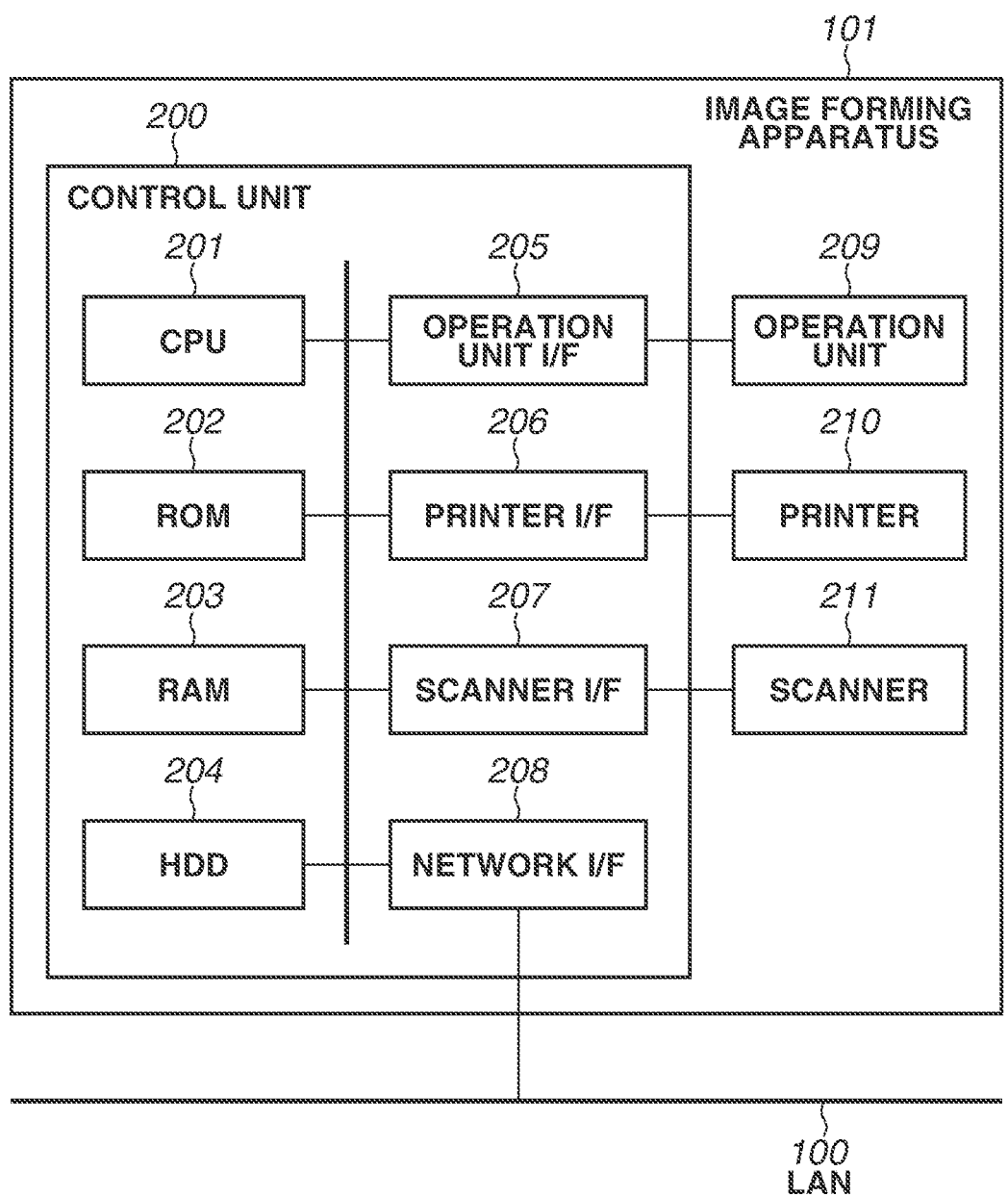
FIG. 2 is a diagram illustrating a hardware configuration of an image forming apparatus in an exemplary embodiment.

FIG. 2 is a block diagram illustrating a hardware configuration of the image forming apparatus 101. A control unit 200, which includes a central processing unit (CPU) 201, controls operations of the entire image forming apparatus 101. The CPU 201 reads out control programs stored in a read-only memory (ROM) 202 and performs various control operations, such as read control and transmission control, based on the control programs. A random access memory (RAM) 203 is used as a temporary storage region, such as a main memory and a work area, for the CPU 201. A hard disk drive (HDD) 204 stores image data and various programs or various pieces of data described below. The image forming apparatus 101 has a hardware configuration serving as an information processing apparatus and, in addition, further has the following hardware configuration.

An operation unit interface (I/F) 205 interconnects an operation unit 209 and the control unit 200. A printer I/F 206 interconnects a printer 210 and the control unit 200. Image data to be printed by the printer 210 is transferred from the control unit 200 via the printer I/F 206 and is then printed on a recording medium by the printer 210. A scanner I/F 207 interconnects a scanner 211 and the control unit 200. The scanner 211 reads an image on an original to generate image data, and then inputs the generated image data to the control unit 200 via the scanner I/F 207.

A network I/F 208 connects the control unit 200 (i.e., the image forming apparatus 101) to the LAN 100. The network I/F 208 transmits image data or information to an external apparatus on the LAN 100 and receives various pieces of information from an external apparatus on the LAN 100.

Figure 3:
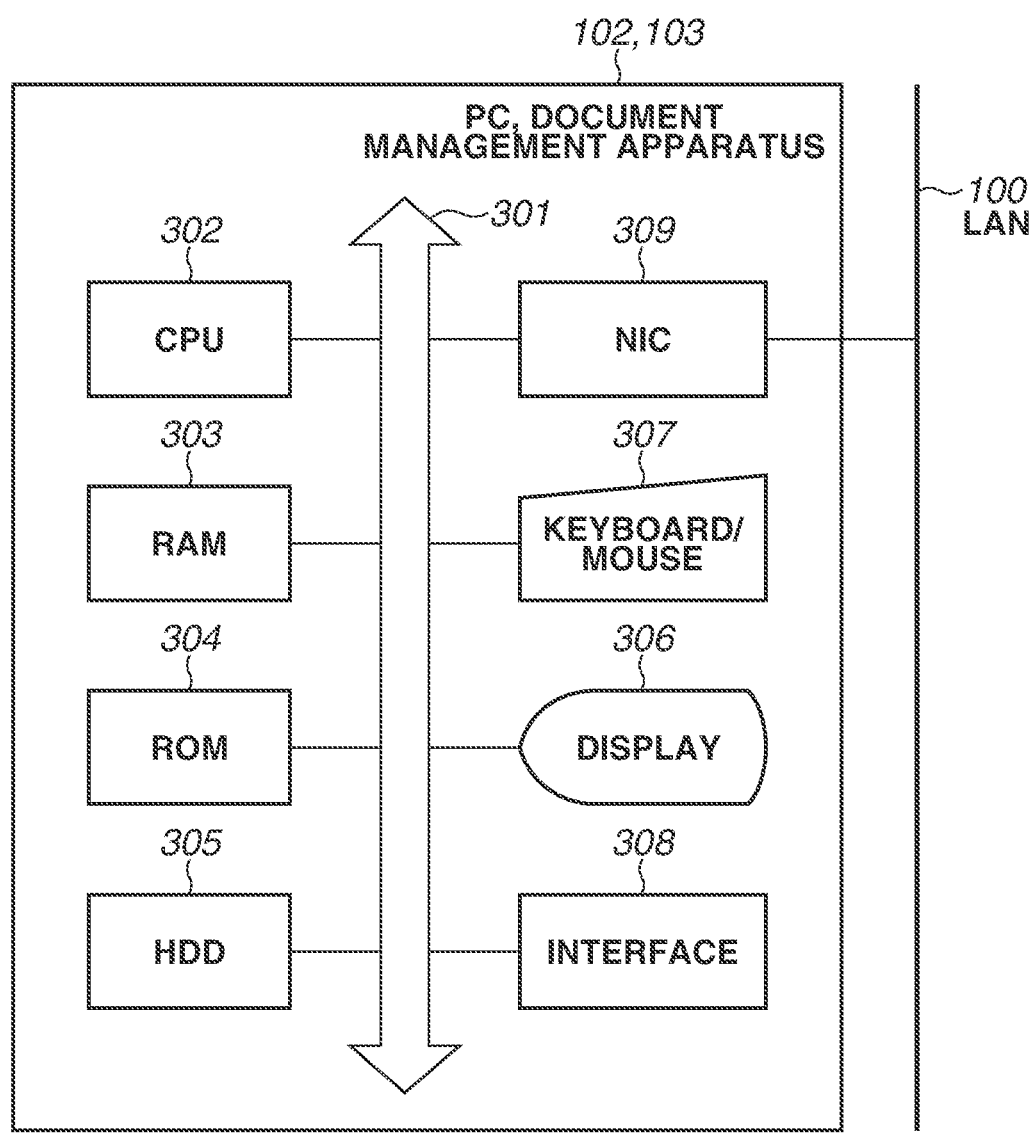
FIG. 3 is a diagram illustrating a hardware configuration of each of a personal computer (PC) and a document management apparatus in an exemplary embodiment.

FIG. 3 is a block diagram illustrating a hardware configuration of each of the PC 102 and the document management apparatus 103. A CPU 302 controls the entire PC 102 or document management apparatus 103. The CPU 302 executes, for example, an application program and an operating system (OS) stored in an HDD 305 and performs control to temporarily store, for example, information and files required for execution of the program in a RAM 303. A ROM 304, which is a storage unit, stores therein various pieces of data, such as a basic input-output (I/O) program. The RAM 303, which is a temporary storage unit, serves as, for example, a main memory and a work area for the CPU 302. The HDD 305, which is an external storage unit, serves as a large-capacity memory and stores, for example, application programs, such as an office application and a web browser, an OS, and relevant programs.

A display 306, which is a display unit, displays, for example, a command input via a keyboard/mouse 307, which is an instruction input unit. An interface 308, which is an external apparatus interface (I/F), is used to connect to a printer, a Universal Serial Bus (USB) device, or a peripheral device. A system bus 301 is used for data to flow between the respective units of the PC 102 or the document management apparatus 103. A network interface card (NIC) 309 performs exchange of data with an external apparatus via the LAN 100.

Furthermore, the configuration of such an information processing apparatus is merely an example, and is not limited to the configuration examples illustrated in FIG. 2 and FIG. 3. For example, the storage location of data or programs can be changed between, for example, the ROM 304, the RAM 303, and the HDD 305 depending on characteristics thereof. Unless otherwise specifically described in the first exemplary embodiment, respective processing operations are assumed to be implemented by the CPU 302 loading programs stored in, for example, the ROM 304 onto, for example, the RAM 303 and executing the programs.

Figure 4:
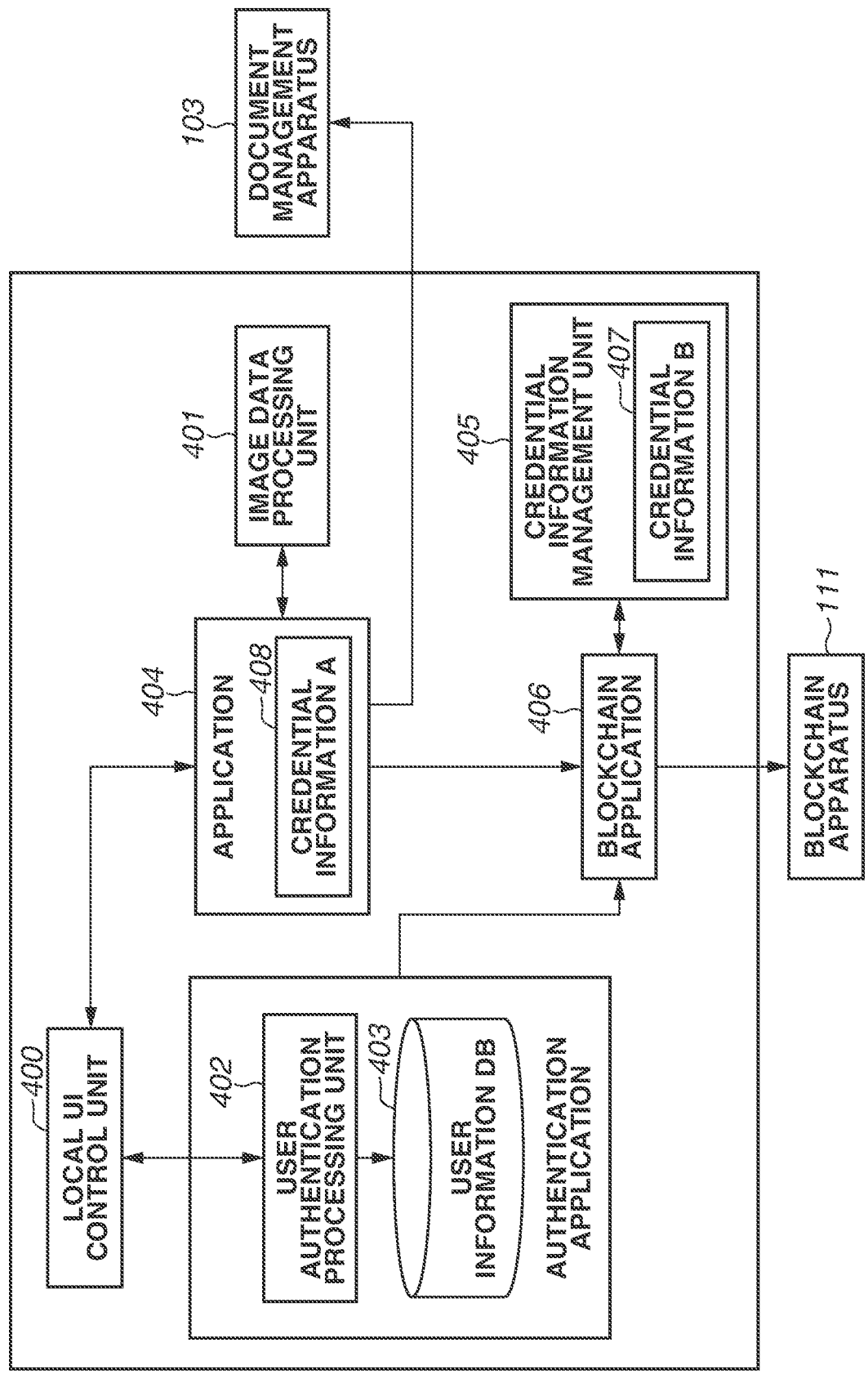
FIG. 4 is a diagram illustrating a software configuration of the image forming apparatus in an exemplary embodiment.
Figure 9:
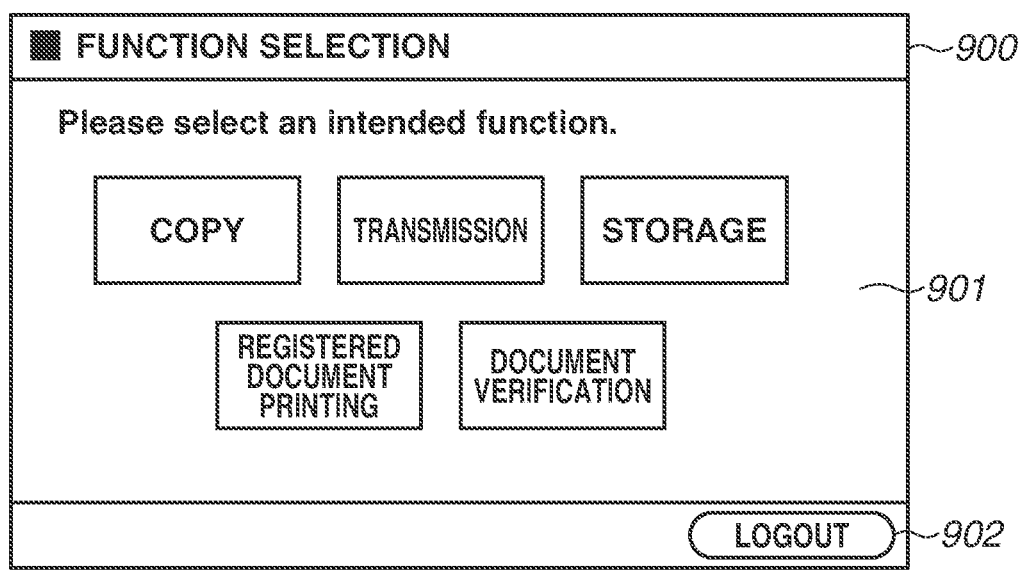
FIG. 9 is a diagram illustrating an example of a function selection screen, which is displayed on the operation unit, in an exemplary embodiment.

FIG. 4 is a block diagram illustrating a software configuration related to the first exemplary embodiment in the image forming apparatus 101. Unless otherwise described, each processing unit is a software function which is implemented by the CPU 201 executing a control program stored in the ROM 202. A local user interface (UI) control unit 400 provides the function of controlling the operation unit 209 via the operation unit I/F 205. The local UI control unit 400 communicates the content of an operation performed by the user via the operation unit 209 to a user authentication processing unit 402 or an application 404. The local UI control unit 400 displays a function selection screen 900, an example of which is illustrated in FIG. 9, on the operation unit 209. The local UI control unit 400 performs control to display a screen on the operation unit 209 upon receiving a screen display request from the user authentication processing unit 402 or the application 404. The user authentication processing unit 402 or the application 404 displays a screen on the operation unit 209 via the local UI control unit 400.

Figure 7:
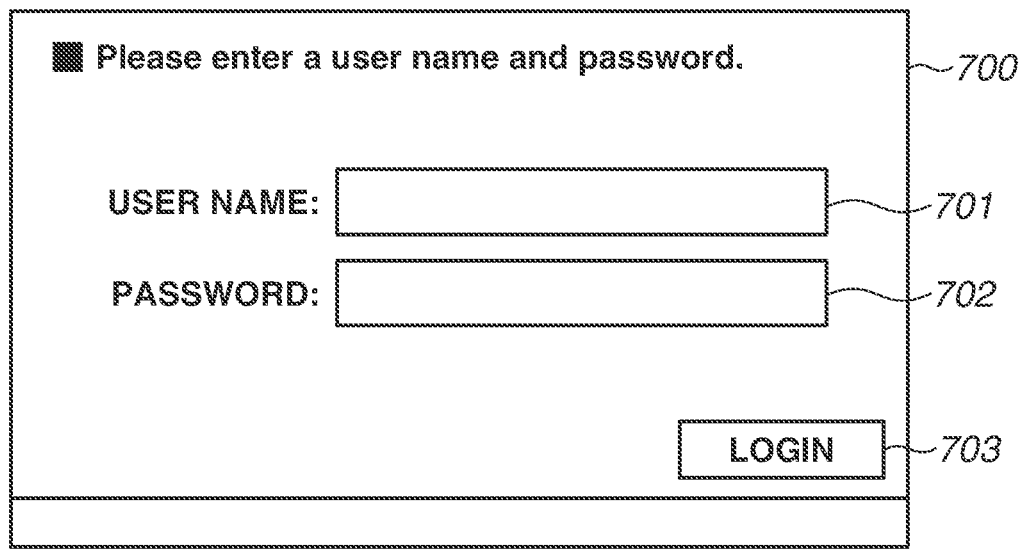
FIG. 7 is a diagram illustrating an example of an authentication screen, which is displayed on an operation unit, in an exemplary embodiment.

The user authentication processing unit 402 provides the function of authenticating a user who uses the image forming apparatus 101. Therefore, the user authentication processing unit 402 displays an authentication screen 700, an example of which is illustrated in FIG. 7, on the operation unit 209. The user authentication processing unit 402 performs user authentication by receiving, via the authentication screen 700, authentication information including a user name and a password input by the user and then comparing the received authentication information with user information stored in a user information database (DB) 403. Furthermore, user authentication is the same as general processing, and is, therefore, omitted from description.

The user information DB 403 provides the function of storing user information which is information about users who use the image forming apparatus 101. The user information includes, for example, user names, passwords, and integrated circuit (IC) card information. The user information DB 403 is created in the HDD 204, and pieces of information constituting the user information DB 403 are stored in the HDD 204.

The application 404 provides the function of receiving an electronic document and printing the electronic document with the printer 210 via the printer I/F 206. Furthermore, the printing function includes a function of printing an image of a paper document with tampering detection information and existence proof information embedded therein via an image data processing unit 401 described below. The application 404 also provides two verification functions of verifying the presence of absence of tampering and verifying that a target paper document is a valid paper document, by scanning a paper document with tampering detection information embedded therein with the scanner 211 via the scanner I/F 207 and analyzing the obtained image data via the image data processing unit 401. Moreover, the application 404 includes a function for performing reference to a transaction for the blockchain apparatus 111 and registration of the transaction via a blockchain application 406.

Figure 11:
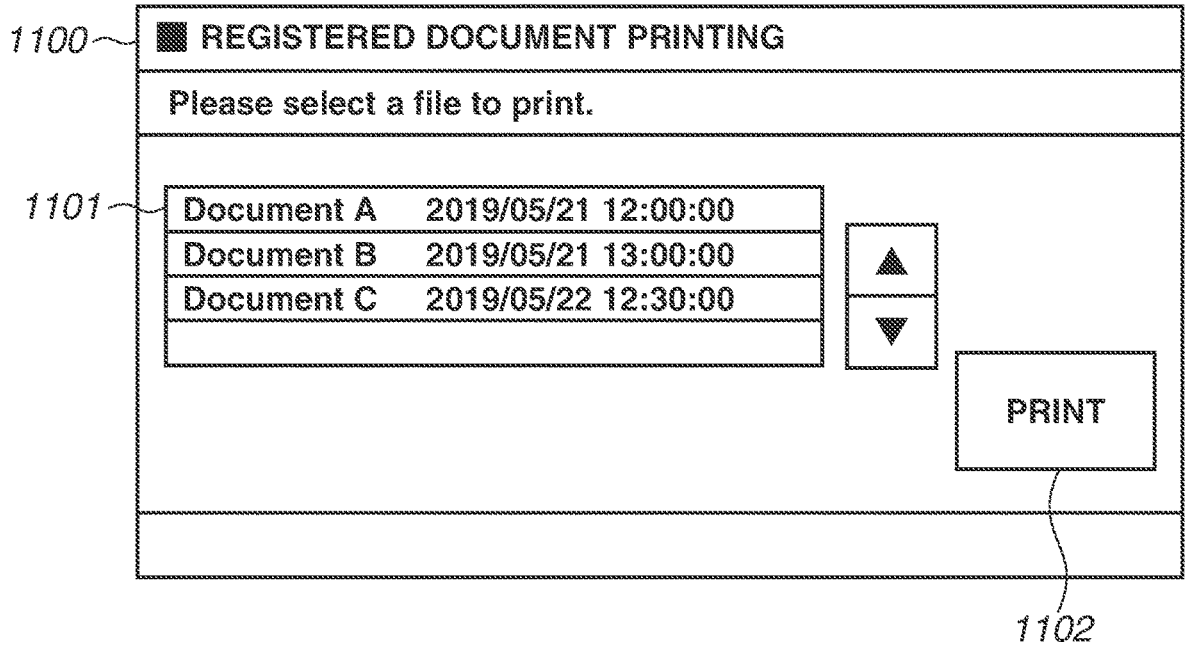
FIG. 11 is a diagram illustrating an example of a registered document printing screen, which is displayed on the operation unit, in an exemplary embodiment.

The application 404 provides screen information to the local UI control unit 400, and receives an input from the user to a screen displayed on the operation unit 209 via the local UI control unit 400 and performs processing corresponding to the received input. The application 404 displays, on the operation unit 209, a registered document printing screen 1100, an example of which is illustrated in FIG. 11, and a verification screen 1200, an example of which is illustrated in FIG. 12.

Furthermore, while, in the first exemplary embodiment, an example in which the functions of printing and verification of a document are included in a single application is described, such functions can be shared by a plurality of applications. For example, a configuration in which a printing application for performing printing of a document and a verification application for performing verification are separately provided can be employed.

The image data processing unit 401 provides an embedding function of converting an electronic document into printable image data and embedding additional information, such as tampering detection information and existence proof information, in the image data to generate an embedded image. Moreover, the image data processing unit 401 provides the function of extracting additional information, such as tampering detection information, from image data acquired by scanning a paper document with the scanner 211. Furthermore, while, in the first exemplary embodiment, an example in which the image data processing unit 401 generates image data to be printed and the application 404 prints the generated image data with the printer 210 via the printer I/F 206 is described, the first exemplary embodiment is not limited to this example. For example, a configuration in which the image data processing unit 401 directly prints the image data with the printer 210 via the printer I/F 206 can be employed.

Figure 6:
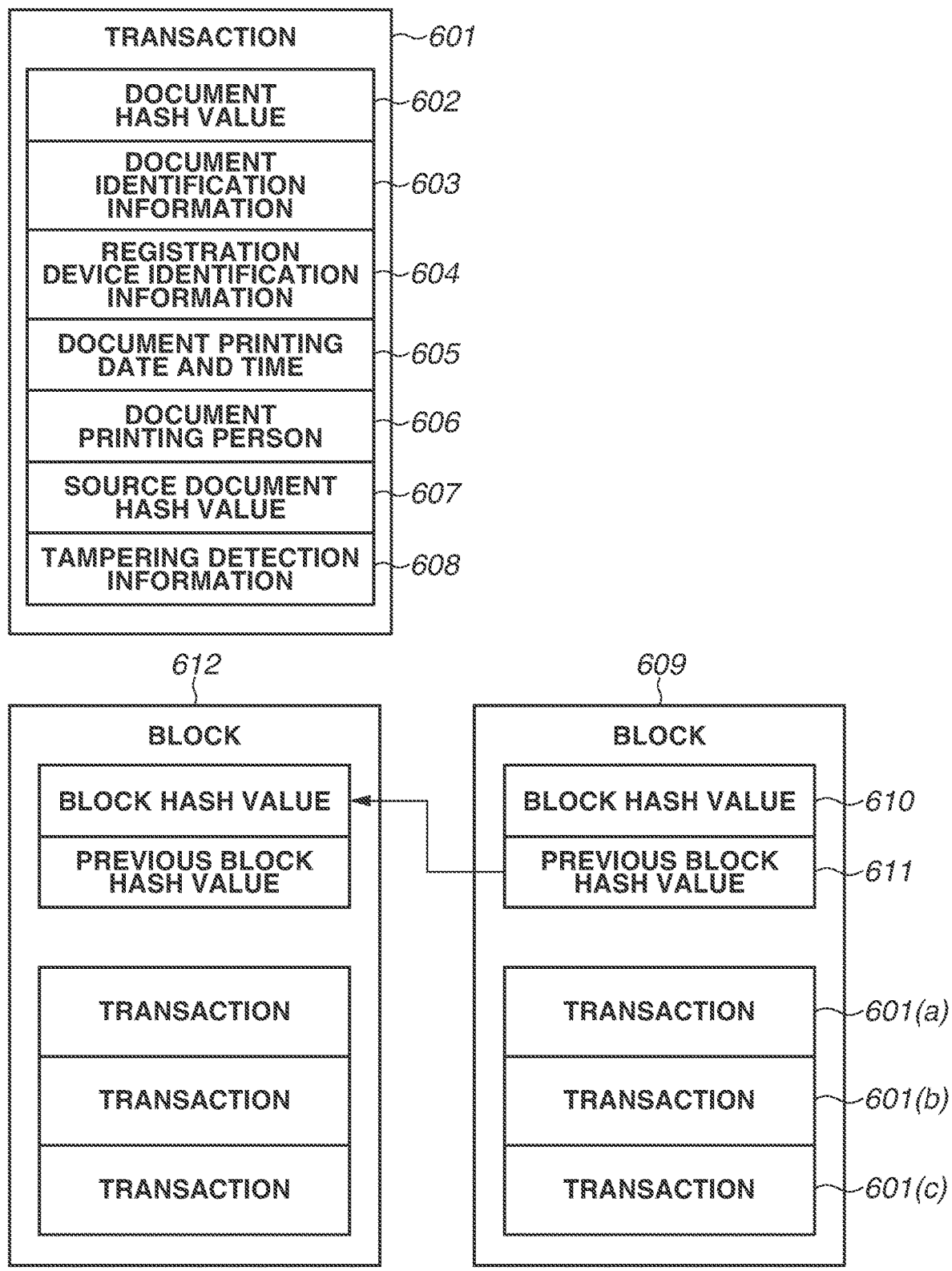
FIG. 6 is a diagram illustrating a data configuration for a blockchain apparatus in an exemplary embodiment.

The blockchain application 406 is an application for performing blockchain cooperation, and provides the function of receiving an instruction from the application 404 and registering, acquiring, and verifying information about a document with respect to the blockchain apparatus 111. Examples of data structures of a transaction 601 and blocks which the blockchain application 406 registers with the blockchain apparatus 111 are illustrated in FIG. 6, but details thereof are described below.

When receiving an instruction for the blockchain apparatus 111 from the application 404, the blockchain application 406 also receives credential information from a credential information management unit 405. The blockchain application 406 performs verification of the received credential information, and performs processing with respect to the blockchain apparatus 111 only when the verification is successful.

Credential information A 408 is credential information for insuring that the application 404 is a legitimate application which is allowed to use the blockchain apparatus 111. The credential information A 408 is issued with respect to an application which has been verified to be performing correct processing, and the application with the credential information incorporated therein is loaded on the image forming apparatus 101.

Credential information B 407 is credential information for insuring that the image forming apparatus 101 is a legitimate apparatus which is allowed to use the blockchain apparatus 111. The credential information B 407 can be issued for each apparatus manufacturer by, for example, an organization which administrates the present system. The credential information B 407 can be shipped out in the state of being incorporated in firmware of the image forming apparatus 101, or can be installed on the image forming apparatus 101 after being shipped out.

Furthermore, credential information can be a digital certificate or a key pair including a private key and a public key or can be a predetermined data value, so that the substance of credential information has no limitation. Credential information can be a substance which differs for each application.

The credential information management unit 405 provides the function of managing credential information included in the image forming apparatus 101. In the first exemplary embodiment, upon receiving an instruction from the blockchain application 406, the credential information management unit 405 passes on the credential information B 407 to the blockchain application 406. Furthermore, in the first exemplary embodiment, even in a case where the PC 102 cooperates with the blockchain apparatus 111 via the image forming apparatus 101, the credential information management unit 405 is configured not to provide the credential information B 407 to the PC 102.

Figure 5:
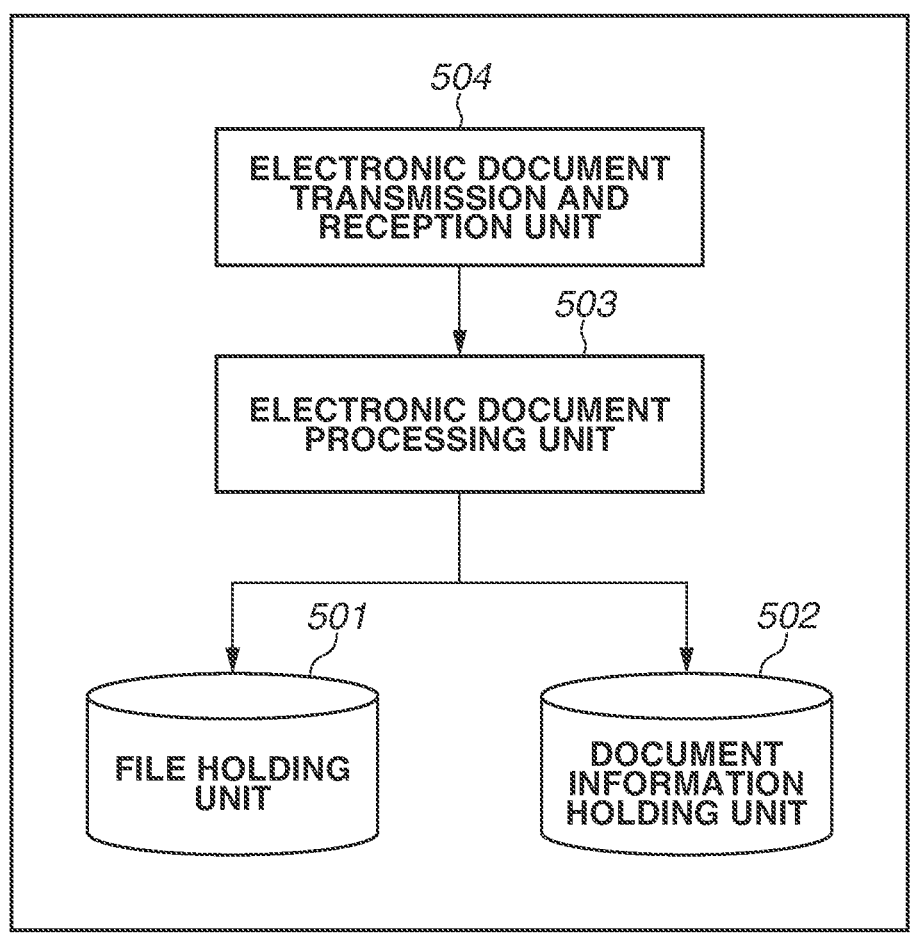
FIG. 5 is a diagram illustrating a software configuration of the document management apparatus in an exemplary embodiment.

FIG. 5 is a block diagram illustrating a software configuration related to the first exemplary embodiment in the document management apparatus 103. As with the software configuration illustrated in FIG. 4, the software configuration illustrated in FIG. 5 is implemented by the CPU 302, the ROM 304, and the RAM 303. Electronic documents which the document management apparatus 103 manages include document files, which are stored in a file holding unit 501, and pieces of information indicating respective documents, which are stored in a document information holding unit 502. Data to be stored in the document information holding unit 502 is information set forth in a document information table shown in Table 1.

TABLE 1

| Document ID | Document name | Registration date and time | File path |
|---|---|---|---|
| 1 | Document A | 2019 May 21 12:00 | D:\Document\document0001.pdf |
| 2 | Document B | 2019 May 21 13:00 | D:\Document\document0002.pdf |
| 3 | Document C | 2019 May 22 12:30 | D:\Document\document0003.pdf |

The document information table shown in Table 1 is configured with columns "ID", "document name", "registration date and time", and "file path". The column "ID" indicates identification information for uniquely managing an electronic document. The column "document name" indicates a name which is allocated for the user to discriminate an electronic document. The document name can overlap between a plurality of electronic documents. The column "registration date and time" indicates a date and time at which an electronic document was stored in the document management apparatus 103. The column "file path" indicates a location at which a document file stored in the file holding unit 501 is stored. In the first exemplary embodiment, the file path is expressed as a path on a file system, but does not need to be a path as long as it is information uniquely representing a storage location.

While these columns are configured with minimum items required for describing the first exemplary embodiment, for example, information for classifying documents can be additionally stored. An electronic document processing unit 503 has the function of accessing the file holding unit 501 and the document information holding unit 502 and controlling processing operations, such as registration and acquisition of an electronic document and acquisition of a list. These processing operations to be performed by the electronic document processing unit 503 can be performed by being started up by an electronic document transmission and reception unit 504 having received a request for input-output processing about an electronic document from the outside of the document management apparatus 103, such as the image forming apparatus 101 or the PC 102.

FIG. 6 is a block diagram illustrating data structures of a transaction 601 and blocks each storing a plurality of such transactions, which are stored in the blockchain apparatus 111. The blockchain apparatus 111 is an apparatus which manages data in a formation called a blockchain. The blockchain treats information in units of transactions, and manages the transactions in units of blocks each containing a plurality of transactions.

Since each block has a defined association with blocks occurring before and after the block, the respective blocks are configured in such a way as to maintain a beaded state. Moreover, the blockchain is managed by a plurality of computers called nodes, and has a decentralized equipment configuration in which all of the nodes manage equal block data. Therefore, since, in the case of tampering with block data, updating has to be performed on a plurality of nodes constituting the blockchain, the blockchain is known as a data management method strong in anti-tampering property. Furthermore, the blockchain apparatus 111 is described as a single apparatus, but is actually an apparatus composed of a plurality of computers as mentioned above, and the blockchain service is provided by the plurality of computers.

In the first exemplary embodiment, when printing an electronic document, the image forming apparatus 101 transmits, to the blockchain apparatus 111, information representing a printed paper document, information representing an electronic document serving as a source document, and a transaction representing embedded tampering detection information, and performs management of them with a blockchain. This enables performing not only verification indicating that an electronic document serving as a source of the printed paper document exists in the blockchain apparatus 111 but also verification of the content of a paper document obtained by printing the electronic document.

A transaction 601, which represents processing for an electronic document or a paper document obtained by printing the electronic document with the document management apparatus 103, includes the following seven pieces of information. A document hash value 602 is a hash value calculated to uniquely represent a target electronic document or a paper document obtained by printing the electronic document. The document hash value 602 in the case of an electronic document is a hash value calculated to uniquely represent a target electronic document. This hash value 602 is a value calculated from the entire electronic document file, so that a value to be calculated changes according to a change being made to the electronic document itself. The document hash value 602 in the case of a paper document is a hash value calculated to uniquely represent a paper document, and is assumed to be a hash value calculated based on registration device identification information 604 and document printing date and time 605. Moreover, in the first exemplary embodiment, credential information is also treated as source information based on which to calculate a hash value. However, a method for calculation other than the above-mentioned method can be employed without being limited.

Furthermore, the document hash value 602 is a value calculated by hashing, but can be calculated by a reversible calculation method as long as it is a unique value. These values to be used to prove that, for example, a document or a paper document exists in a unique manner are referred to as existence proof information for verifying the uniqueness of a document and/or the uniqueness of a paper document. Using the existence proof information enables ensuring that a document and/or a paper document when being verified is a document and/or a paper document generated from legitimate data. However, in the case of a paper document, even if the descriptive content of a printed product in which a barcode for existence proof information is included has been tampered with, it is not possible to detect tampering only by the existence proof information.

Document identification information 603 is information which is held to be associated with an electronic document managed in the document management apparatus 103, and, in the first exemplary embodiment, stores "File path" shown in Table 1. Registration device identification information 604 is information for identifying an image forming apparatus 101 which has performed printing of a document, and, in the first exemplary embodiment, stores a hash value of the credential information B 407. A document printing date and time 605 is information representing date and time information at a point of time when a document was registered in the case of an electronic document and is date and time information at a point of time when a document was printed in the case of a paper document. A document printing person 606 is information representing a user who has performed document registration in the case of an electronic document and information representing a user who has performed document printing in the case of a paper document. In the first exemplary embodiment, the document printing person 606 stores the user name of a user who has logged in to the image forming apparatus 101. A source document hash value 607 is information to be used to perform association with an electronic document serving as a source document. In the case of a paper document, the source document hash value 607 is a hash value 602 of a transaction for an electronic document serving as a source of outputting of a paper document, and, in the case of an electronic document, the source document hash value 607 takes no set value (is expressed as blank).

Tampering detection information 608 is information representing tampering detection information embedded in a paper document. The tampering detection information 608 is information to be used to verify a paper document. In the first exemplary embodiment, the tampering detection information 608 is assumed to be position information about yellow dots regularly arranged to detect tampering or alteration, but can be any form of information as long as it is information readable to verify a paper document as described below. The first exemplary embodiment is characterized in that tampering detection information is configured not by reading the descriptive content of a document with, for example, character recognition but by using the positions of dots.

For example, the tampering detection information can be configured with not yellow dots but clear toner or ink or an invisible stealth code. Moreover, the tampering detection information can be not position information about yellow dots but generation pattern information or generation rule information about yellow dots. Moreover, the tampering detection information can be not position information configured with embedded yellow dots but position information or form information about clear toner or two-dimensional barcode. Moreover, the tampering detection information can be image data representing information for detecting tampering or can be a program for detecting tampering or link information to the program. In the subsequent description, for example, such invisible or visible data and pattern rules each of which is embedded in a paper document to detect tampering or alteration are collectively referred to as tampering detection information. Furthermore, in the case of an electronic document, the tampering detection information 608 takes no set value (is expressed as blank).

Next, a structure of a block which holds the transaction 601 is described with reference to a block 609. The block 609 is obtained by schematizing a general blockchain structure. The block 609 holds a plurality of transactions 601(*a*) to 601(*c*) and a block hash value 610 calculated from these transactions 601.

While, in the first exemplary embodiment, the number of transactions 601 included in a block is set to three, the number of transactions is not limited. Moreover, the block 609 further holds a previous block hash value 611 for interconnecting blocks. In the first exemplary embodiment, a block hash value of the block 612 is stored in the previous block hash value 611, thus indicating that the respective blocks have an association with each other. While, in the first exemplary embodiment, a previous block hash value is configured to be stored in each block, a configuration in which a subsequent block hash value is managed or both a previous block hash value and a subsequent block hash value are managed can be employed.

FIG. 7 is a diagram illustrating an example of an authentication screen. The authentication screen 700 illustrated in FIG. 7 is a screen used to provide the function of allowing the user to perform user authentication to use a function of the image forming apparatus 101. A user name entry field 701 is a field into which the user of the image forming apparatus 101 enters a user name. A password entry field 702 is a field into which the user of the image forming apparatus 101 enters a password.

A login button 703 is a button used to initiate user authentication. When the user presses the login button 703, the user authentication processing unit 402 performs user authentication based on values entered in the user name entry field 701 and the password entry field 702.

FIG. 9 is a diagram illustrating an example of a function selection screen which the local UI control unit 400 displays. The function selection screen 900 illustrated in FIG. 9 is a screen which is displayed on the operation unit 209 by the local UI control unit 400 immediately after the user logs in to the image forming apparatus 101 with the authentication screen (FIG. 7) displayed on the operation unit 209. Function selection buttons 901 are buttons operable to use the respective functions of the image forming apparatus 101. The user of the image forming apparatus 101 is able to press a button displayed in this screen to use each function included in the image forming apparatus 101.

A copy button is a button used to display a screen operable to use a copy function, a transmission button is a button used to display a screen operable to use the function of transmitting a scanned document to the PC 102, and a storage button is a button used to display a screen operable to use the function of storing a scanned electronic document in the HDD 204. In the first exemplary embodiment, screens which are displayed after the respective buttons are pressed are omitted from description, but are the same as those displayed in usual functions.

When a registered document printing button is pressed, a registered document printing screen 1100 for printing an electronic document, the details of which are described below, is displayed. When a document verification button is pressed, a verification screen 1200, the details of which are described below, for using a function of performing verification of a scanned paper document is displayed.

A logout button 902 is a button used to perform logout processing, which is displayed during login. When the logout button 902 is pressed, logout processing is performed, and, after that, the authentication screen (FIG. 7) is displayed.

Furthermore, the selection of functions is not limited to this configuration, and, for example, a configuration in which the application 404 is displayed in the function selection screen 900 and functions, such as printing and verification, are allowed to be selected after the application 404 is selected can be employed.

FIG. 11 is a diagram illustrating an example of a screen used to print an electronic document, which the application 404 displays on the operation unit 209. The registered document printing screen 1100 illustrated in FIG. 11 is a screen used to provide the function of printing an electronic document which is currently managed by the blockchain apparatus 111 and is stored in the document management apparatus 103 or the image forming apparatus 101.

A document selection list 1101 is a list used to select a document to be printed, and the application 404 displays, in the document selection list 1101, documents which are currently managed by the document management apparatus 103. A print button 1102 is a button used to perform printing of a document selected in the document selection list 1101.

FIG. 12 is a diagram illustrating an example of a screen used to verify a scanned document, which the application 404 displays on the operation unit 209. The verification screen 1200 illustrated in FIG. 12 is a screen used to provide the function of verifying that a paper document is a registered and legitimate paper document and that there is no tampering in the paper document, by scanning the paper document and making an inquiry to the blockchain apparatus 111. A verify button 1203 is a button used to perform scanning of a document and then perform verification of the document with use of the blockchain apparatus 111.

FIG. 15 is a flowchart of print processing which the image forming apparatus 101 performs with respect to an electronic document stored in the document management apparatus 103. Furthermore, the electronic document stored in the document management apparatus 103 is an electronic document the document information about which is previously registered with the blockchain apparatus 111.

The present flowchart is executed after the user logs in to the image forming apparatus 101 with the authentication screen (FIG. 7) and the function selection screen 900 is displayed on the operation unit 209 by the local UI control unit 400.

In S1501, upon detecting that the registered document printing button 901 in the function selection screen 900 has been pressed by the user, the application 404 displays the registered document printing screen 1100 on the operation unit 209.

In S1502, upon displaying the registered document printing screen 1100 illustrated in FIG. 11 on the operation unit 209, the application 404 waits until an electronic document is selected from the document selection list 1101 in the registered document printing screen 1100 and the print button 1102 is pressed.

Then, if the print button 1102 has been pressed (YES in S1502), the application 404 advances the processing to S1503.

In S1503, the application 404 acquires, from the document management apparatus 103, the electronic document selected from the document selection list 1101 in the registered document printing screen 1100. The application 404 temporarily stores the acquired electronic document (including document information and an electronic file) in the HDD 204.

In S1504 and S1505 described below, the application 404 performs determination as to whether the acquired electronic document is an electronic document which is currently managed by the blockchain apparatus 111. Therefore, the application 404 transmits, to the blockchain application 406, an acquisition request indicating transaction acquisition as a processing type, the electronic document acquired in S1503, the credential information B 407, and the credential information A 408. The credential information A 408 is used by the blockchain application 406 to verify that a series of processing operations concerning acquisition of an electronic document is being performed by a legitimate application.

In S1504, upon receiving the acquisition request from the application 404, the blockchain application 406 acquires a transaction 601 in which "File path" included in document information about the received electronic document is set as the document identification information 603. This processing for transaction acquisition is described below with reference to FIG. 17. Then, the blockchain application 406 transmits a result of the acquisition processing and, if acquisition is successful, the acquired transaction information to the application 404.

In S1505, the application 404 checks whether the electronic document is currently managed by the blockchain apparatus 111, by determining whether the applicable transaction information has been able to be acquired in S1504. In the case of error information indicating that there is no transaction information, since the electronic document is a document which is not currently managed by the blockchain apparatus 111 (NO in S1505), the application 404 advances the processing to S1506. On the other hand, in a case where there is transaction information (YES in S1505), the application 404 advances the processing to S1507, and then starts print processing with tampering detection information set therein in S1507 to S1510 described below.

In S1506, the application 404 displays an error screen on the operation unit 209 and then ends processing in the present flowchart. Furthermore, while, in S1506 in the first exemplary embodiment, the application 404 displays an error screen and then ends the processing, the application 404 can print a document file stored in the HDD 204 in S1503 with ordinary print processing (printing without tampering detection information set therein) by the printer 210 and end the processing after completion of the print processing.

In S1507, the application 404 calculates a document hash value for uniquely identifying a printed paper document. Here, the application 404 calculates the document hash value 602 with use of the credential information B 407 about the image forming apparatus 101 which performs the printing and date and time information included in the image forming apparatus 101 at the present time (at the time of processing in this operation).

In S1508, the application 404 determines a generation pattern for tampering detection information to be embedded in a paper document in S1509 described below. In the first exemplary embodiment, information usable as tampering detection information and generation patterns are assumed to be previously stored in the HDD 204. Furthermore, while the tampering detection information is assumed to be configured with a group of yellow dots and the generation pattern is assumed to be configured with a plurality of yellow dots being embedded at regular intervals in the whole paper document, the first exemplary embodiment is not limited to this method. For example, the tampering detection information can be assumed to be embedded in a previously determined position or a position designated by the user, or the embedding position can be assumed to be dynamically determined based on a random number or the content of a document file acquired in S1503. However, information about the size, shape, and density of each yellow dot and the generation pattern for use in the tampering detection information, which have been determined here, are also used for verification processing described below. Therefore, in the first exemplary embodiment, these pieces of information are assumed to be stored in the HDD 204 or the RAM 203.

In S1509, the application 404 generates image data in which an image of tampering detection information that is based on a barcode of the document hash value calculated in S1507 and the generation pattern determined in S1508 has been embedded in the document file acquired in S1503. Furthermore, this processing in S1509 is performed by the application 404 via the image data processing unit 401. The image data generated in this way is referred to as "image data with tampering detection information set therein".

The details of processing in S1509 are described. First, the application 404 transmits, to the image data processing unit 401, a request for generation of printing image data, the document file acquired in S1503, the document hash value calculated in S1507, and the generation pattern for tampering detection information determined in S1508.

Upon receiving these pieces of information, first, the image data processing unit 401 generates printing image data from the document file. More specifically, the image data processing unit 401 rasterizes the electronic document to generate image data of the bitmap format. Next, the image data processing unit 401 generates document hash information with the received document hash value coded and embedded therein, and converts the generated document hash information into an image. In the first exemplary embodiment, the image data processing unit 401 is assumed to generate a QR code (abbreviated from Quick Response code) including character string information representing the document hash value, and converts the generated QR code into an image. Thus, the document hash value and the character string information correspond to each other. Furthermore, since the method of causing information about the document hash value to be included in the QR code is previously stored in the HDD 204, document verification described below is enabled to detect a QR code as information with a document hash value embedded therein. After that, the image data processing unit 401 combines image data in which the imaged document hash value has been embedded with image data about the document file to generate image data. Furthermore, in the subsequent direction, the generated image data is referred to as "image data with document hash set therein". Furthermore, while, in the first exemplary embodiment, a document hash value is embedded in a QR code, a document hash value can be embedded in image data by a method of embedding a two-dimensional barcode of another type, an invisible electronic watermark, or another type of tracking information.

After that, the image data processing unit 401 generates tampering detection information based on the received generation pattern for tampering detection information, converts the generated tampering detection information into an image for embedding, and embeds the image for embedding in the image data with document hash set therein, thus generating image data with tampering detection information set therein. Finally, the image data processing unit 401 transmits the generated image data and the embedded tampering detection information to the application 404. Furthermore, in the first exemplary embodiment, since the generation pattern for tampering detection information is a pattern in which tampering detection information is embedded at regular intervals in the whole paper document, the image data with tampering detection information set therein is image data with document hash set therein in which image data for yellow dots has been embedded. Then, the embedded tampering detection information includes position coordinates of all of the embedded yellow dots.

Thus far is the detailed description of processing in S1509. Furthermore, while, in the first exemplary embodiment, position information about the tampering detection information is transmitted to the application 404, the first exemplary embodiment is not limited to this method. Another method can be employed as long as the information to be transmitted to the application 404 is information concerning tampering detection which might enable checking that any alteration is not present in tampering detection information embedded in a scanned paper document, at the time of document verification processing described below.

In S1510, the application 404 stores the received position information about tampering detection information in the RAM 203, and prints the image data with tampering detection information set therein generated in S1509 with the printer 210, thus outputting a paper document.

In S1511, the application 404 determines whether a result of printing performed in S1510 is successful. If it is determined that the result of printing is failed (NO in S1511), the application 404 advances the processing to S1506. On the other hand, if it is determined that the result of printing is successful (YES in S1511), the application 404 transmits, to the blockchain application 406, a registration request for transaction registration as a type of processing, transaction information (described below), credential information B 407, and credential information A 408, and then advances the processing to S1512. Furthermore, the credential information A 408 is used by the blockchain application 406 to verify that a series of processing operations concerning acquisition of an electronic document is being performed by a legitimate application.

In S1512, upon receiving the registration request for transaction from the application 404, the blockchain application 406 registers transaction information about the printed paper document with the blockchain apparatus 111. This registration processing is described below with reference to FIG. 17. Here, values to be designated to transaction information to be registered as a transaction 601 are described.

The hash value representing the paper document calculated in S1507 is designated to the document hash value 602. The file path of the electronic document acquired in S1503 is designated to the document identification information 603. The hash value of the credential information B 407 about the image forming apparatus 101 which has performed printing is designated to the registration device identification information 604. The date and time information at a point of time when print processing was performed in S1510 is designated to the document printing date and time 605. The user name of a user who is logged in to the image forming apparatus 101 which has performed printing is designated to the document printing person 606. The document hash value 602 of the transaction of the electronic document acquired in S1503 is designated to the source document hash value 607. The position information about yellow dots embedded in the paper document in S1509 is designated to the tampering detection information 608.

Thus far is the description of the flowchart of FIG. 15. Furthermore, the calculation of a hash value of the paper document in S1507 can be performed at any timing as long as the timing is before the generation of image data in S1509, and can be performed, for example, after processing in S1508.

Figure 16:
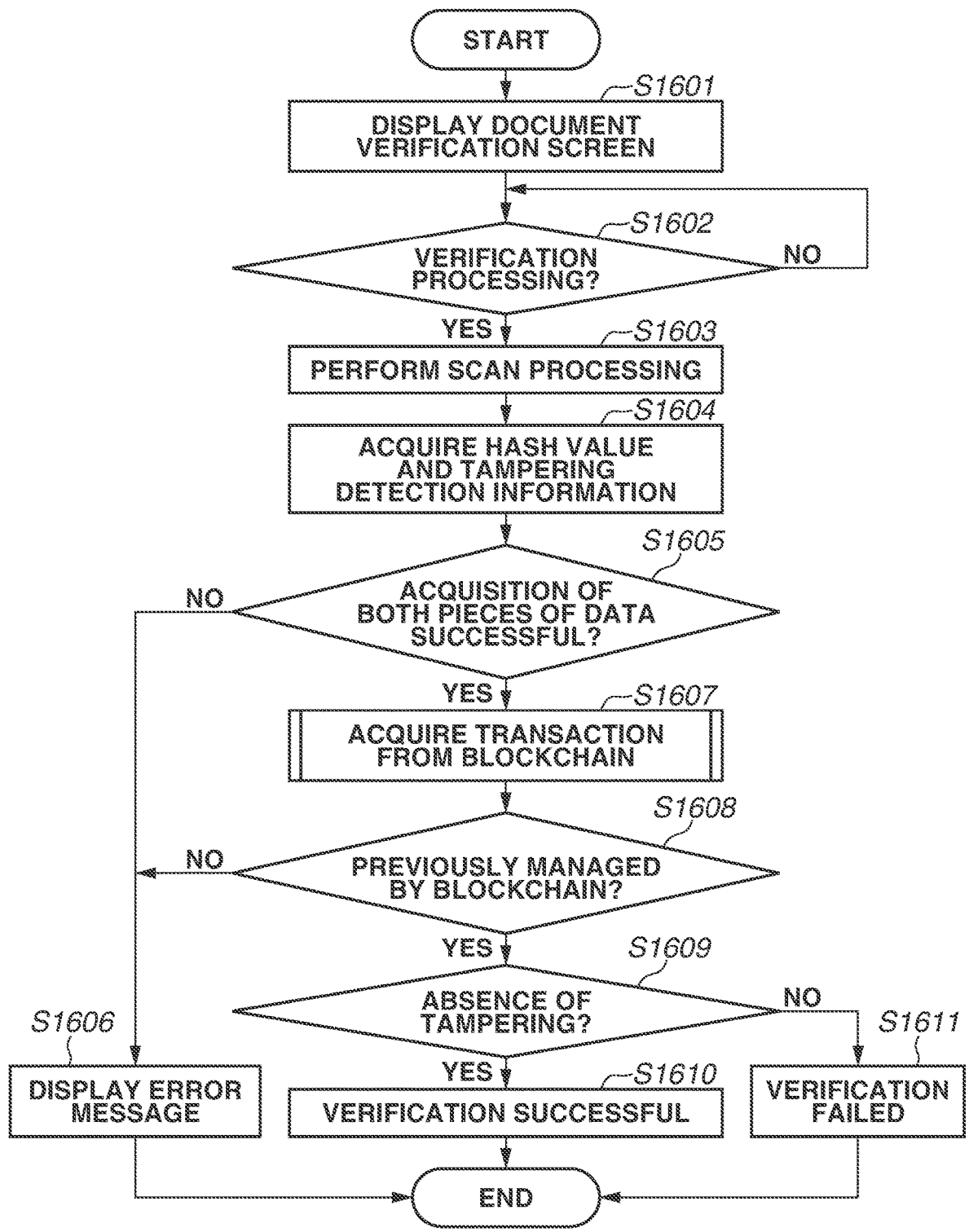
FIG. 16 is a flowchart illustrating processing for verifying an electronic document, in an exemplary embodiment.

FIG. 16 is a flowchart according to which the image forming apparatus 101 scans a paper document and performs verification processing. The present flowchart is executed after the user logs in to the image forming apparatus 101 with the authentication screen (FIG. 7) and the function selection screen 900 is displayed on the operation unit 209 by the local UI control unit 400.

In S1601, upon detecting that the document verification button 901 has been pressed by the user in the function selection screen 900, the application 404 displays the document verification screen 1200 on the operation unit 209. In S1602, upon displaying the document verification screen 1200 illustrated in FIG. 12 on the operation unit 209, the application 404 waits until the verify button 1203 is pressed, and, if the verify button 1203 has been pressed, the application 404 advances the processing to S1603.

In S1603, the application 404 scans a paper document set on the image forming apparatus 101. In this scanning, the application 404 reads the paper document with the scanner 211 via the scanner I/F 207, and generates electronic image data from the read information. Furthermore, the application 404 temporarily stores this image data in the HDD 204, and then deletes the image data at the time of ending of the present flowchart.

In S1604, the application 404 acquires a document hash value and tampering detection information from the embedded image embedded in the image data generated in S1603, and stores the acquired document hash value and tampering detection information in the RAM 203. This acquisition is performed in conformity with the method of embedding performed in S1509 of the print processing described above with reference to FIG. 15, and the details of this acquisition processing are described as follows.

The application 404 transmits an image decomposition request and the image data generated in S1603 to the image data processing unit 401, and, upon receiving them, first, the image data processing unit 401 acquires an embedded image from the received image data. Then, the image data processing unit 401 decodes, i.e., deciphers, the embedded image to acquire a document hash value.

In the first exemplary embodiment, the image data processing unit 401 acquires a QR code as embedded document hash value and decodes the acquired QR code to acquire a document hash value.

Next, the image data processing unit 401 acquires the embedded image from the received image data. Then, the image data processing unit 401 transmits both pieces of data, i.e., the document hash value and the tampering detection information, to the application 404. In the first exemplary embodiment, yellow dots are used as tampering detection information. Therefore, the image data processing unit 401 acquires the embedded yellow dots from the received image data, and transmits position coordinates of all of the acquired yellow dots as tampering detection information together with the document hash value to the application 404. Furthermore, in a case where the image data processing unit 401 has not been able to acquire such both pieces of data, the image data processing unit 401 transmits a data acquisition failure to the application 404. Thus far are the details of processing for acquiring a document hash value and tampering detection information from image data.

In S1605, the application 404 determines whether both pieces of data, i.e., the document hash value and the tampering detection information, have been able to be acquired in S1604, and, if it is determined that such both pieces of data have not been able to be acquired (NO in S1605), since verification processing is impossible, the application 404 advances the processing to S1606. On the other hand, if it is determined that such both pieces of data have been able to be acquired (YES in S1605), the application 404 transmits, to the blockchain application 406, an acquisition request for acquiring a transaction as a type of processing, and then advances the processing to S1607. Furthermore, when transmitting this acquisition request, the application 404 also transmits the document hash value acquired in S1604, credential information B 407, and credential information A 408 to the blockchain application 406.

In S1606, the application 404 displays a standard dialog (not illustrated) for displaying an error message indicating that verification is failed or impossible on a screen of the operation unit 209, and then ends the processing in the present flowchart. Furthermore, in the first exemplary embodiment, the application 404 ends the processing after displaying an error message in S1606. However, in a case where, here, a document hash value has been able to be acquired, the application 404 can be configured to verify whether the paper document is currently registered with the blockchain apparatus 111 (S1607 and S1608 described below). However, in that case, since tampering detection information has not been able to be acquired, the application 404 does not perform verification of tampering detection information (S1609 described below).

In S1607, the blockchain application 406 acquires transaction information having the document hash value received from the application 404 from among pieces of transaction information which are currently registered with the blockchain apparatus 111. This processing is described below with reference to FIG. 17. After that, the blockchain application 406 transmits a result of acquisition of the transaction information and, if the acquisition is successful, the acquired transaction information to the application 404, and then advances the processing to S1608.

In S1608, the application 404 determines whether the transaction information has been able to be acquired in S1607, and, if it is determined that the transaction information has been able to be acquired (YES in S1608), the application 404 advances the processing to S1609 and, if it is determined that the transaction information has not been able to be acquired (NO in S1608), the application 404 advances the processing to S1606.

In S1609, the application 404 determines whether there is no tampering in the scanned paper document. The details of this processing are described. The application 404 determines the presence or absence of tampering by comparing the tampering detection information embedded in the printed product acquired in S1604 with tampering detection information included in the transaction acquired in S1607. In the first exemplary embodiment, the application 404 performs such determination by checking whether position information about the tampering detection information 608 included in the transaction information acquired in S1607 and the position information about yellow dots acquired in S1604 are all the same. Then, if they are the same, the application 404 determines that there is no tampering (YES in S1609) and advances the processing to S1610, and, if they are not the same, the application 404 determines that there is a tampering (NO in S1609) and advances the processing to S1611. Thus far is the detailed description of this processing.

Figure 10A:
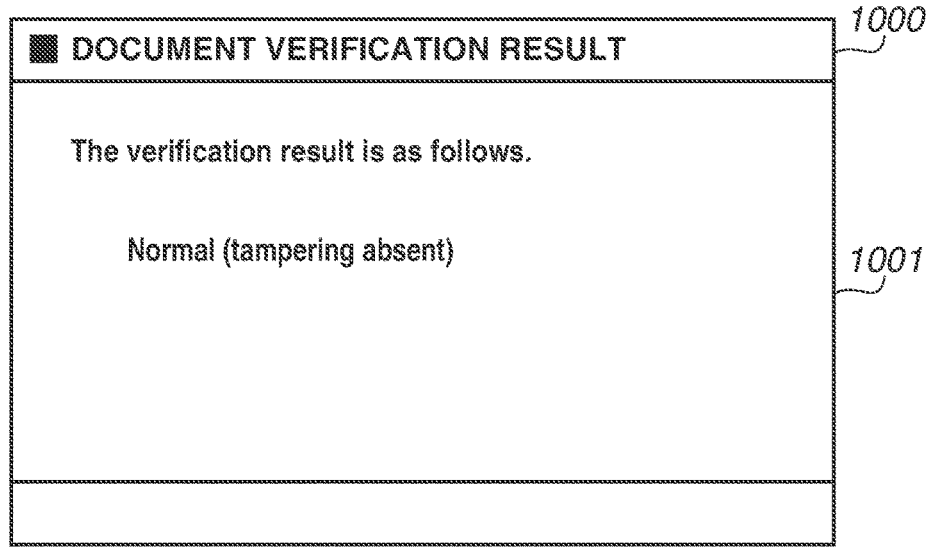
FIGS. 10A, 10B, and 10C are diagrams illustrating examples of verification screens, each of which is displayed on the operation unit, in an exemplary embodiment.
Figure 10B:
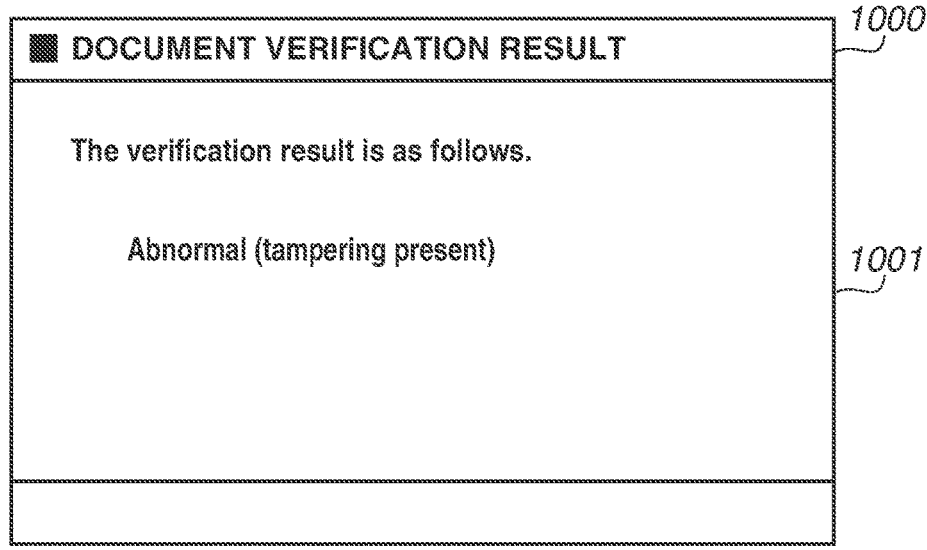

In S1610, the application 404 displays, on the operation unit 209, a message indicating that, for example, since there is no tampering, verification is successful. FIG. 10A illustrates an example of a screen for displaying such a message. As illustrated in FIG. 10A, the application 404 displays a message indicating that the verification has normally ended in a result display area 1001 of a document verification result screen 1000. In S1611, the application 404 displays, on a screen of the operation unit 209, a message indicating that there is a tampering or the verification is failed. FIG. 10B illustrates an example of a screen for displaying such a message. As illustrated in FIG. 10B, the application 404 displays a message indicating that the verification is failed in the result display area 1001 of the document verification result screen 1000.

Thus far is the description of the flowchart of FIG. 16. Furthermore, while, in the first exemplary embodiment, the application 404 acquires both the document hash value and the tampering detection information from the image data in S1604, the application 404 can be configured to acquire only the document hash value in S1604. In this case, the application 404 acquires tampering detection information included in the image data immediately before S1609, thus becoming able to also acquire tampering detection information only in a case where the document hash value is not invalid.

Figure 17:
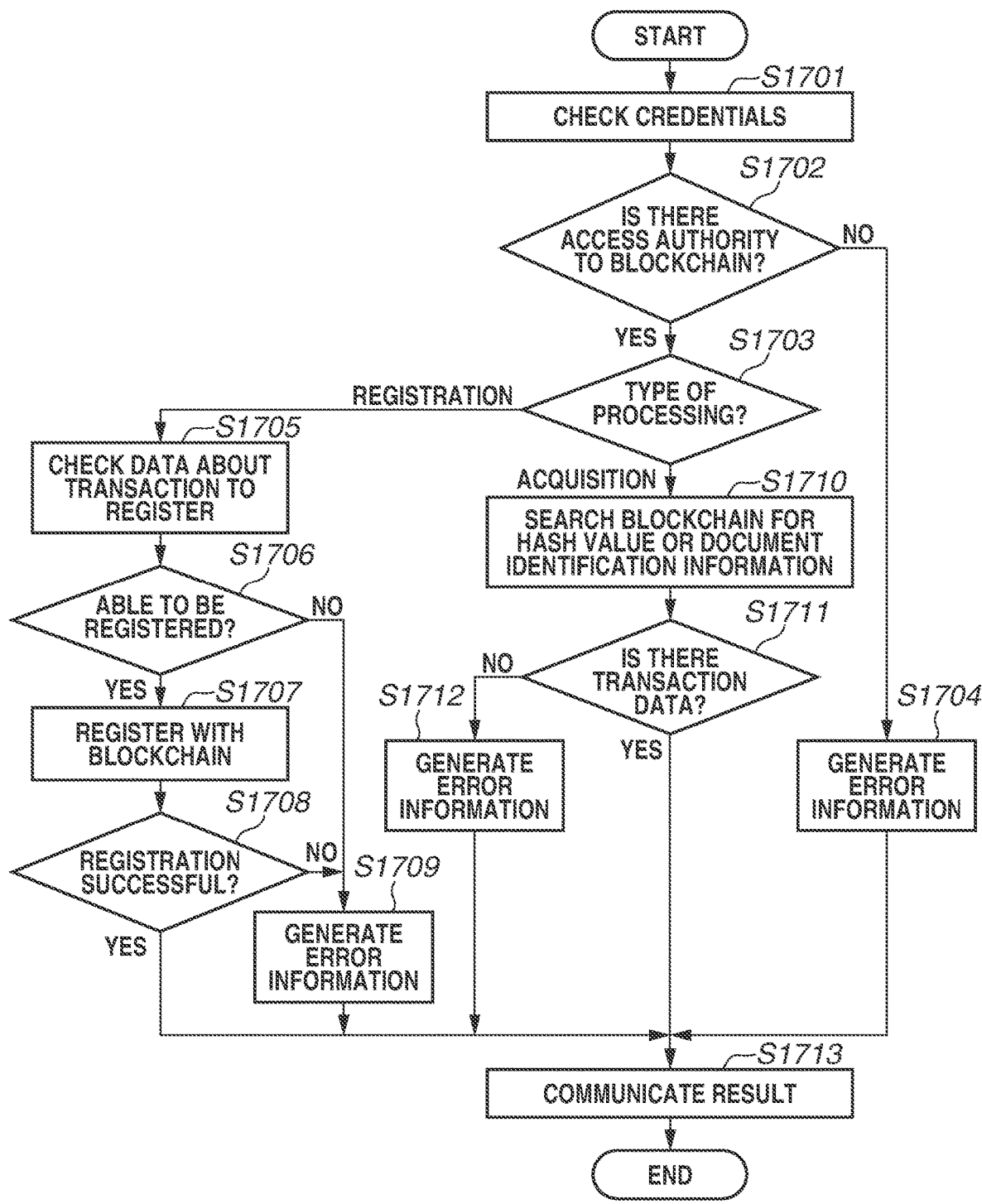
FIG. 17 is a flowchart illustrating transaction processing for the blockchain apparatus, in an exemplary embodiment.

FIG. 17 is a flowchart according to which the blockchain application 406 of the image forming apparatus 101 performs transaction processing to the blockchain apparatus 111. The present flowchart is executed by the blockchain application 406 during processing performed by the application 404 described with reference to FIG. 15 and FIG. 16.

At the time of start of the present flowchart, types of processing to the blockchain apparatus 111 and information required for each type of processing are passed from the application 404 to the blockchain application 406. The information required for each type of processing includes transaction information 601 at the time of transaction registration and a document hash value 602 or a document identification information 603 at the time of transaction acquisition.

In S1701, the blockchain application 406 passes credential information B 407 and credential information A 408 to the blockchain apparatus 111 to check that they are correct credential information. Here, the credential information B 407 to be used is credential information acquired from the credential information management unit 405 at the time of start-up of the blockchain application 406, and the credential information A 408 to be used is credential information acquired from the application 404.

In S1702, the blockchain application 406 determines whether the credential information checked in S1701 is correct credential information. With regard to determination as to whether the checked credential information is correct credential information, when, in a case where the credential information is a digital certificate, verification performed on the certificate is successful, the blockchain application 406 determines that the checked credential information is correct credential information. Moreover, when, in a case where the credential information is a previously determined data value, values are identical to each other, the blockchain application 406 determines that the checked credential information is correct credential information. If the checked credential information is correct credential information, since an access to the blockchain apparatus 111 is possible (YES in S1702), the blockchain application 406 advances the processing to S1703, and, if the checked credential information is not correct credential information (NO in S1702), the blockchain application 406 advances the processing to S1704.

In S1703, the blockchain application 406 determines a type of processing received from the application 404. If the type of processing is transaction registration (REGISTRATION in S1703), the blockchain application 406 advances the processing to S1705, and, if the type of processing is transaction acquisition (ACQUISITION in S1703), the blockchain application 406 advances the processing to S1710. In S1704, the blockchain application 406 generates error information indicating that an access authority to the blockchain apparatus 111 is not satisfied in the present flowchart.

In S1705, the blockchain application 406 determines whether the transaction information received at the time of start-up of processing is complete. Moreover, this determination includes checking whether the document hash value 602 of the received transaction information is still not registered in the blockchain apparatus 111 and whether the source document hash value 607 is previously registered in the blockchain apparatus 111. Here, in a case where the transaction information is not complete or the hash values are not in the respective correct states, the transaction information is invalid information. In S1706, the blockchain application 406 determines the result of checking in S1705, and, if it is determined that the transaction information is valid (YES in S1706), the blockchain application 406 advances the processing to S1707, and, if it is determined that the transaction information is invalid information (NO in S1706), the blockchain application 406 advances the processing to S1709 for error processing.

In S1707, the blockchain application 406 requests the blockchain apparatus 111 to register the checked transaction 601 received at the time of start-up of processing. In this operation, the blockchain application 406 receives success or failure as a result of the registration processing from the blockchain apparatus 111. In S1708, the blockchain application 406 determines the result of the registration processing received from the blockchain apparatus 111, and, if it is determined that the result is failure (NO in S1708), the blockchain application 406 advances the processing to S1709 for error processing, and, if it is determined that the result is success (YES in S1708), the blockchain application 406 advances the processing to S1713. In S1709, the blockchain application 406 generates error information indicating that the transaction registration is not able to be performed in the present flowchart.

In S1710, the blockchain application 406 searches the blockchain apparatus 111 to acquire a transaction which holds the information received at the time of start-up of processing in the document hash value 602 or the document identification information 603. Furthermore, the blockchain application 406 is able to confirm the root of a document serving as a source of the printed product by searching for a previous block associated with a block including the acquired transaction.

In S1711, the blockchain application 406 determines a result of the searching, and, if it is determined that no transaction data has been acquired (NO in S1711), since the target document is not registered with the blockchain apparatus 111, the blockchain application 406 advances the processing to S1712 for error processing. If it is determined that transaction data has been acquired (YES in S1711), the blockchain application 406 advances the processing to S1713. In S1712, the blockchain application 406 generates error information indicating that the transaction acquisition is failed in the present flowchart.

In S1713, the blockchain application 406 communicates, to processing serving as an invoker, information obtained when processing is successful for each type of processing. Specifically, the blockchain application 406 communicates, to processing serving as an invoker, a registration completion status in the case of transaction registration, the acquired transaction information in the case of transaction acquisition, and error information in the case of error processing. Thus far is the description of the flowchart of FIG. 17.

Next, specific examples using the above-described flowcharts of FIG. 15 and FIG. 16 are described. Furthermore, while, in the following description, numbers in the flowcharts of FIG. 15 and FIG. 16 are also mentioned as reference, since the details of processing operations in the respective operations have been described above, such details are omitted from description here.

Electronic documents the "IDs" of which in Table 1 are "1" to "3" are assumed to be currently stored in the document management apparatus 103, and these three electronic documents are assumed to be currently registered with the blockchain apparatus 111. Transaction information included in the blockchain apparatus 111 about an electronic document the "ID" of which is "1" out of such electronic documents is described in detail with reference to FIG. 8A. The document hash value 602 is "12345678", the document identification information 603 is "D:\temp\memo01.pdf", and the registration device identification information 604 is "ZZZZ9999". The document printing date and time 605 is "201905211200", which represents twelve o'clock, May 21, 2019. The document printing person 606 is "tanaka", and each of the source document hash value 607 and the tampering detection information 608 has no designated value. Moreover, the credential information B 407 about the image forming apparatus 101 is assumed to be "cert00.dat", and the credential information A 408 about the application 404 is assumed to be "cert01.dat". Furthermore, these pieces of credential information are the same as credential information for use in usual authentication and, therefore, the detailed description thereof is omitted.

At this time, a user the user name of whom is "tanaka" logs in with the authentication screen (FIG. 7) of the image forming apparatus 101. Then, the user presses the registered document printing button 901 in the function selection screen 900 illustrated in FIG. 9 to display the registered document printing screen 1100 illustrated in FIG. 11 (S1501). Then, after that, the user is assumed to select an electronic document named "Document A", the "ID" of which is "1", in the document selection list 1101 of the registered document printing screen 1100, and press the print button 1102 (S1502). With this operation, the application 404 stores the electronic document the "ID" of which is "1" in the HDD 204 (S1503). Then, the application 404 transmits, to the blockchain application 406, a request for transaction acquisition as a type of processing, the electronic document the "ID" of which is "1", and two pieces of credential information "cert00.dat" and "cert01.dat".

Figure 8A:
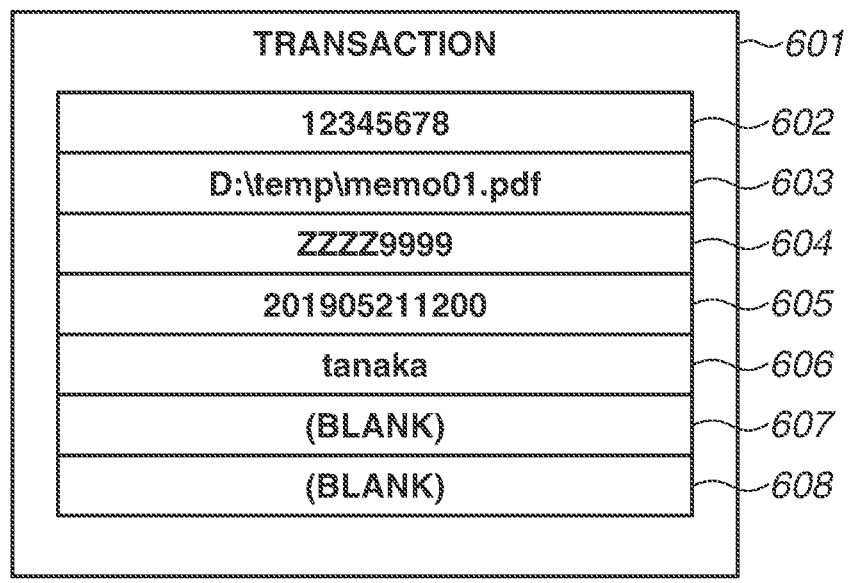
FIGS. 8A and 8B are diagrams illustrating specific examples of transactions for the blockchain apparatus, each of which is displayed on the operation unit, in an exemplary embodiment.

Upon receiving these, the blockchain application 406 acquires the transaction 601 illustrated in FIG. 8A as a transaction having, as document identification information, the file path "D:\temp\memo01.pdf" of the electronic document (S1504). Then, the blockchain application 406 transmits this transaction information to the application 404. Upon receiving this, the application 404 has been able to acquire the transaction information (YES in S1505) and, therefore, starts print processing of the image data with tampering detection information set therein.

First, the application 404 calculates a hash value with the credential information "cert00.dat" about the image forming apparatus 101 which performs processing and the current clock time used as arguments for a hash function (S1507). Here, the current clock time is assumed to be "202009181030", and the calculated document hash value is assumed to be "aaaaaaaa" Furthermore, the method of calculating a hash value is the same as a usual method and, therefore, the detailed description thereof is omitted.

While, after that, the application 404 determines a generation pattern for tampering detection information, here, a pattern indicating "embed yellow dots at regular intervals in the whole paper document" is assumed to be previously stored in the HDD 204. Therefore, the application 404 acquires the pattern from the HDD 204 and sets the acquired pattern as a generation pattern (S1508). Then, the application 404 transmits, to the image data processing unit 401, a request for printed product image data generation, the electronic document the "ID" of which is "1", the document hash value "aaaaaaaa", and the generation pattern for tampering detection information indicating "embed yellow dots at regular intervals in the whole paper document".

Figure 13A:
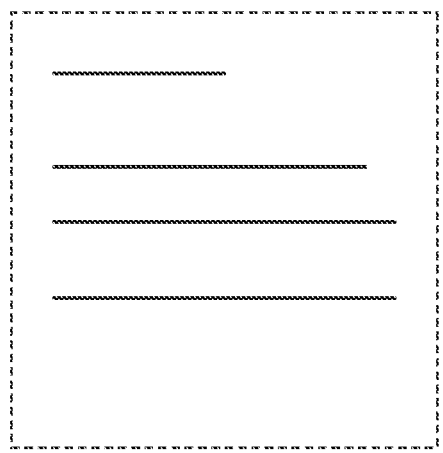
FIGS. 13A, 13B, 13C, and 13D are imagery diagrams of image data to be used for obtaining a paper document, in an exemplary embodiment.
Figure 13B:
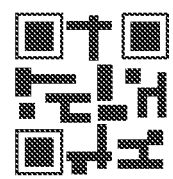

Upon receiving these, first, the image data processing unit 401 rasterizes the document file to generate image data of the bitmap format. FIG. 13A is an imagery diagram of the generated image data. In FIG. 13A, a dotted line represents a printing range, and solid lines represent an image obtained by abstracting data to be printed on a paper document. Here, since the number of solid lines is four, the solid lines represent data for printing character strings at the positions of the solid lines. Next, the image data processing unit 401 generates information with the received document hash value coded and embedded therein, and generates image data obtained by converting the generated information into an image. Specifically, the image data processing unit 401 generates image data about a QR code with the document hash value "aaaaaaaa" embedded therein. FIG. 13B is an imagery diagram of the generated image data. The imagery diagram of FIG. 13B illustrates an image obtained by enlarging the image data about a QR code, and information indicating "aaaaaaaa" is included in the QR code. Next, the image data processing unit 401 combines image data of the document file with image data with the QR code embedded therein, thus generating image data (image data with document hash set therein). Furthermore, while, here, the position at which to embed the QR code is assumed to be an upper right portion of the paper document and this information is assumed to be previously stored in the HDD 204, the QR code can be embedded at another position and in another method as long as information about the embedded document hash value is able to be read in verification processing.

Figure 13C:
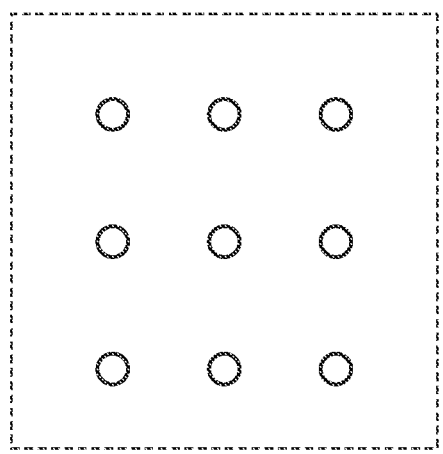

Next, the image data processing unit 401 generates image data for printing yellow dots according to the pattern "embed yellow dots at regular intervals in the whole paper document". FIG. 13C is an imagery diagram of image data for printing yellow dots. Each mark "o" in FIG. 13C is an image representing image data for printing yellow dots. Moreover, the regular intervals are intervals for enabling printing yellow dots at nine portions, so that this results in generating image data for printing yellow dots at nine portions. Furthermore, while, in the first exemplary embodiment, for ease of explanation, yellow dots are assumed to be printed at only nine portions, to more accurately detect tampering, it is desirable to print more yellow dots. Moreover, for ease of explanation, printing data for yellow dots is expressed by a large mark "o" in the image data, but is actually printing data with a size unlikely to be viewed by the user (for example, about 80 micrometers (μm)). The size, shape, and density of each yellow dot to be printed are to be used for detection of yellow dot embedding data in verification processing and are, therefore, assumed to be previously stored in the HDD 204.

Figure 13D:
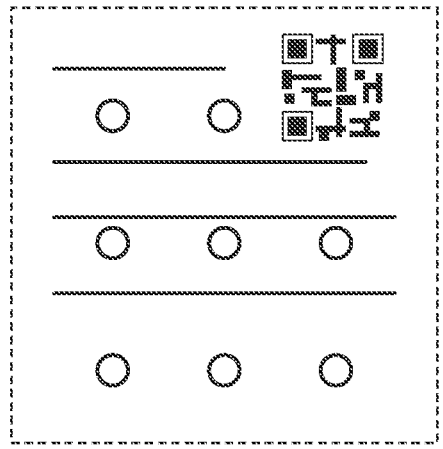

Next, the image data processing unit 401 combines image data of the document file with an image of the received document hash value, thus generating image data with document hash set therein. Then, the image data processing unit 401 combines the image data for printing yellow dots with the generated image data with document hash set therein, thus generating image data (image data with tampering detection information set therein) (S1509). FIG. 13D is an imagery diagram of the image data with tampering detection information set therein. In FIG. 13D, to make the image data with document hash set therein able to be read in verification processing described below, an upper right yellow dot in FIG. 13C is deleted at the time of image data combination. This processing for deleting a yellow dot is implemented by the image data processing unit 401 determining whether the printing position (position information) of a yellow dot generated by the generation pattern is present within a display region of the QR code and deleting the yellow dot. This eliminates a phenomenon in which, if both a QR code and a yellow dot are printed, the QR code becomes unable to be read. As a result, yellow dots are present at eight portions. Furthermore, processing for, for example, image data generation and determination of printing positions of yellow dots such as those illustrated in FIGS. 13A to 13D is the same as processing performed in the usual image processing and, therefore, the detailed description thereof is omitted.

After that, the image data processing unit 401 transmits, to the application 404, the generated image data with tampering detection information set therein and position information about the eight embedded yellow dots. Upon receiving this, the application 404 stores the position information about eight yellow dots in the RAM 203, and causes the printer 210 to print this image data, thus outputting a paper document (S1510). Furthermore, the position information about eight yellow dots is assumed to be (52, 74), (104, 74), (52, 148), (104, 148), (156, 148), (52, 228), (104, 228), and (156, 228) and is assumed to be stored in the RAM 203. Moreover, print processing in S1510 is assumed to have been performed at 9 o'clock, Jul. 11, 2019, and this value is assumed to be stored in the RAM 203.

If outputting of a paper document is successful (YES in S1511), the application 404 transmits, to the blockchain application 406, a registration request for transaction registration as a type of processing and the transaction information.

Upon receiving the transaction information, the blockchain application 406 registers the transaction 601 with the blockchain apparatus 111 (S1512). Here, the blockchain application 406 registers the transaction 601 illustrated in FIG. 8B. In this transaction 601, the document hash value 602 is "aaaaaaaa", the document identification information 603 is "D:\temp\\memo01.pdf", and the registration device identification information 604 is "ZZZZ9999". Moreover, the document printing date and time 605 is "201907110900", the document printing person 606 is "tanaka", and the source document hash value 607 is "12345678". Then, the tampering detection information 608 is "52, 74, 104, 74, 52, 148, 104, 148, 156, 148, 52, 228, 104, 228, 156, 228", which is position information about yellow dots. This represents a sequence of x-coordinates and y-coordinates of the position information about eight yellow dots. Specifically, positions at which to embed yellow dots are (52, 74), (104, 74), (52, 148), (104, 148), (156, 148), (52, 228), (104, 228), and (156, 228). Furthermore, here, the tampering detection information 608 is represented by coordinates of eight yellow dots, but can be represented by another method.

For example, yellow dots to be printed are printed at positions shifting from the upper left portion in increments of 52 in horizontal direction and 74 in vertical direction within a region of (52, 74) to (156, 228). However, no yellow dot is printed in a region of (120, 0) to (210, 90) in which to print an upper left QR code. Therefore, these sequentially arranged numerals "52, 74, 156, 218, 52, 74, 120, 0, 210, 90" can be set as the tampering detection information 608. Moreover, as another method, pattern information which determines at what positions to print yellow dots can be set as the tampering detection information 608. For example, a pattern "perform printing in a case where yellow dots at nine portions are able to be read at regular intervals according to a paper size for use in printing" can be previously stored as pattern information in the HDD 204, and the tampering detection information 608 can be named "pattern A".

Then, after completion of registration, the blockchain application 406 communicates ending of processing to the application 404, so that the application 404 ends the processing in the present flowchart.

Next, a specific example of verification processing for verifying a paper document is described with reference to the flowchart of FIG. 16. Furthermore, first, a specific example of verification processing for a paper document just printed by the above-described print processing (a paper document without being subjected to tampering) is described, and, then, a specific example of verification processing for a paper document obtained by tampering with the printed paper document is described.

Figure 14A:
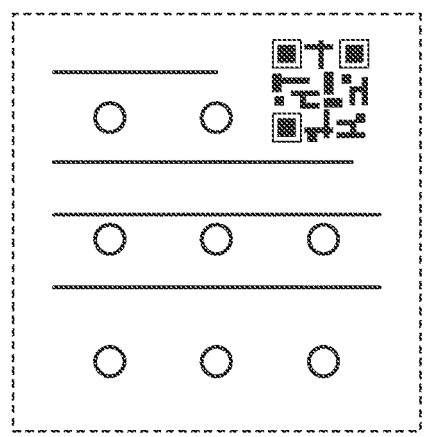
FIGS. 14A, 14B, 14C, and 14D are imagery diagrams of image data obtained by performing scanning, in an exemplary embodiment.

A user the user name of whom is "tanaka" logs in to the image forming apparatus 101. Then, the user presses the document verification button 901 in the function selection screen 900 illustrated in FIG. 9 to display the document verification screen 1200 illustrated in FIG. 12 (S1601). After that, the user is assumed to press the verify button 1203 (S1602). With this operation, the application 404 reads the paper document with the scanner 211, generates image data from the read information, and stores the generated image data in the HDD 204 (S1603). FIG. 14A is an imagery diagram of the generated image data. Furthermore, expressions illustrated in FIG. 14A are the same as those in FIG. 13D.

Figure 14B:
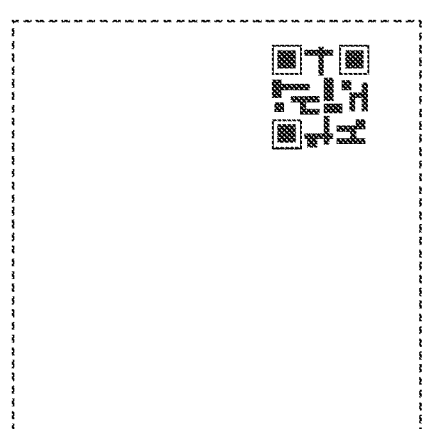
Figure 14C:
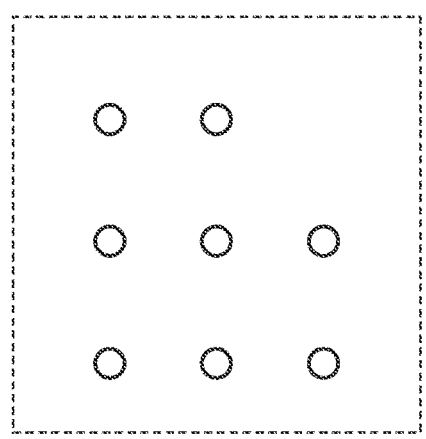

Next, to acquire a document hash value and an embedded image embedded in the image data generated in S1603, the application 404 transmits an image data decomposition request to the image data processing unit 401. Upon receiving this request, the image data processing unit 401 performs processing for acquiring, from the received image data, information with the document hash value and the tampering detection information embedded therein in S1509 in the print processing (S1604). Here, the image data processing unit 401 is assumed to acquire information with the document hash value embedded therein illustrated in the imagery diagram of FIG. 14B and decode a QR code of the acquired information, thus acquiring a document hash value "aaaaaaaa" Next, the image data processing unit 401 acquires information with the tampering detection information embedded therein from the received image data. Here, the image data processing unit 401 acquires information with the tampering detection information embedded therein illustrated in the imagery diagram of FIG. 14C and acquires yellow dots and position information for printing yellow dots from the acquired information. Here, printing positions for yellow dots at eight portions are assumed to have been able to be acquired. Then, the image data processing unit 401 transmits the acquired document hash value and position information for eight yellow dots to the application 404.

Upon receiving these, the application 404 has been able to acquire both pieces of data (YES in S1605) and, therefore, transmits an acquisition request for transaction acquisition as a type of processing to the blockchain application 406. Furthermore, in this transmission, the application 404 transmits both the document hash value "aaaaaaaa" and pieces of credential information "cert00.dat" and "cert01.dat".

Figure 8B:
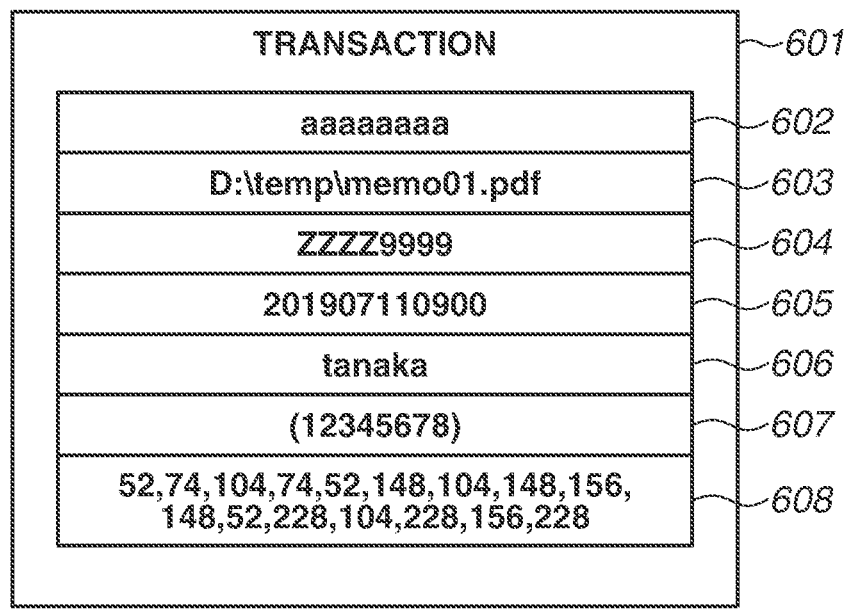

Upon receiving these, the blockchain application 406 acquires the transaction 601 illustrated in FIG. 8B as a transaction having the received document hash value "aaaaaaaa" as the document hash value 602. Then, the blockchain application 406 transmits information indicating that the transaction has been able to be acquired to the application 404 (S1607).

After that, upon acquiring the transaction information (YES in S1608), the application 404 determines whether there is no tampering in the scanned paper document (S1609). Specifically, the application 404 performs such determination by checking whether the tampering detection information 608 included in the transaction information illustrated in FIG. 8B and the position information about yellow dots acquired in S1604 are all the same. Here, since eight pieces of position information included in the transaction information 608 and eight pieces of position information embedded in the image data obtained by scanning are the same, the application 404 determines that there is no tampering. After that, to indicate that the verification result is the absence of tampering, the application 404 displays a screen illustrated in FIG. 10A on the operation unit 209 (S1610).

Figure 14D:
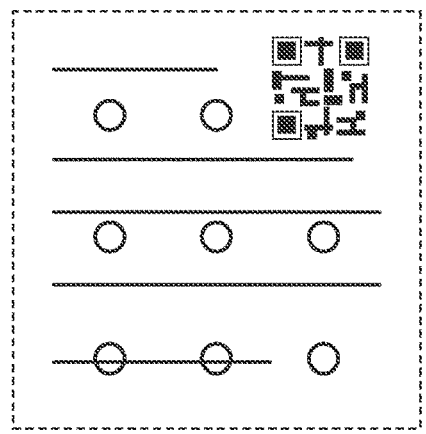

Next, a specific example of a case where a printed paper document obtained by the printing processing has been tampered and the tampered paper document has been verified is described. Processing in S1601 to S1603 are the same as that at the time of verification of a paper document not subjected to tampering and, therefore, the description thereof is omitted. However, an image of the image data which is able to be acquired by performing processing in S1603 is assumed to be an image illustrated in FIG. 14D. FIG. 14D illustrates an image in which a paper document with four lines of character strings displayed therein has been subjected to addition of the last line (has been tampered), thus becoming a paper document with five lines of character strings displayed therein.

Furthermore, the fifth line of character string is added onto yellow dots. In S1604, the application 404 is able to similarly acquire "aaaaaaaa" as the hash value but is able to acquire only six yellow dots as the tampering detection information. This is because, while the application 404 tries to acquire yellow dots from the received image data, since a character string has been added onto yellow dots, the application 404 is not able to detect yellow dots having the same size, shape, and density as those of the embedded yellow dots. For this reason, the application 404 is not able to acquire two lower left yellow dots (yellow dots at positions (52, 228) and (104, 228)).

After that, the application 404 has been able to acquire the hash value and the tampering detection information (YES in S1605) and, therefore, acquires transaction information illustrated in FIG. 8B having the document hash value "aaaaaaaa" (S1607). Then, the application 404 has been able to acquire the transaction information (YES in S1608) and, therefore, determines whether there is no tampering in S1609. Here, since, while the tampering detection information 608 included in the transaction 601 is position information about eight yellow dots, the yellow dots acquired in S1604 have six sets of position coordinates, the application 404 determines that there is a tampering in S1609. When determining that there is a tampering (NO in S1609), the application 404 displays a screen illustrated in FIG. 10B on the operation unit 209 (S1611).

Figure 10C:
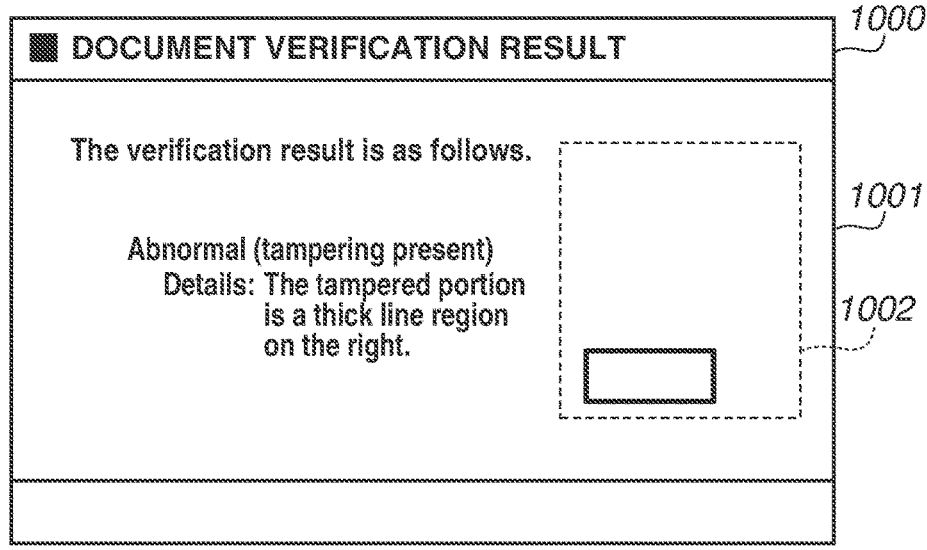

Thus far is the description of a specific example of the flowchart of FIG. 16. Furthermore, when determining that there is a tampering in S1609, the application 404 can not only display a message in the result display area 1001 but also display a portion at which there is a tampering in a tampering portion display area 1002 of the document verification result screen 1000 illustrated in FIG. 10C. In FIG. 10C, a region with a specified size including a yellow dot which exhibits a difference as a result of comparison of tampering detection information in S1609 is indicated by a thick line frame, and, here, the thick line frame is displayed at a lower left portion of the tampering portion display area 1002.

Displaying a tampered portion to the user in the above-mentioned way also enables, even in a case where it is determined that there is a tampering due to the user performing stapling or stamping, readily determining whether the tampering is the one intended by the user or whether the tampering is the one performed by another malicious user.

In the above-described first exemplary embodiment, when generating image data with tampering detection information set therein in S1509, the application 404 determines position information for printing yellow dots in such a manner that both the document data acquired in S1503 and the document hash value generated in S1507 are displayed in a readable manner. In this case, since it is impossible to print tampering detection information in a region with a document hash value embedded therein, there is a possibility of the region for the document hash value being tampered. Therefore, in a second exemplary embodiment, in S1509, the application 404 can combine a document hash value and tampering detection information into one piece of information and perform printing of one embedded image generated from the one piece of information.

While the method for such an operation includes various methods, for example, there is a method of embedding a document hash value in dots by using a method of embedding additional information in dots. This method enables adding additional information according to printing positions of dots or adding additional information according to densities of dots. An example of the method of adding additional information (here, a document hash value) according to densities of dots is described with reference to the imagery diagrams of FIGS. 18A and 18B.

Figure 18A:
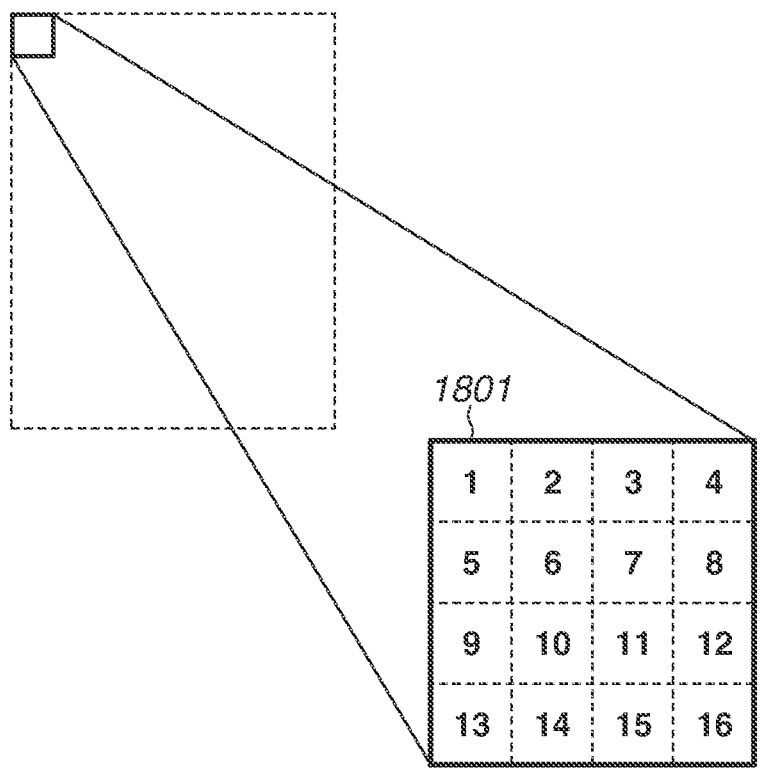
FIGS. 18A and 18B are imagery diagrams illustrating a method of adding additional information according to printing positions of dots, in an exemplary embodiment.

FIG. 18A is an imagery diagram illustrating, at an upper left portion thereof, image data to be printed on a paper document and, at a lower right portion thereof, a printing region 1801, as enlarged, for printing one yellow dot. The printing region 1801 is a region including an information region 1 to an information region 15, in any one of which one yellow dot is to be necessarily printed. Then, additional information is added according to in which of the information region 1 to the information region 15 to print a yellow dot. Specifically, printing being performed in the information region 1 is assumed to represent "0" in hexadecimal, printing being performed in the information region 2 is assumed to represent "1" in hexadecimal, and printing being performed in the information region 3 is assumed to represent "2" in hexadecimal (the same applying to printing being performed in the information region 4 and subsequent information regions). A specific example of this case is described with reference to FIG. 18B.

Figure 18B:
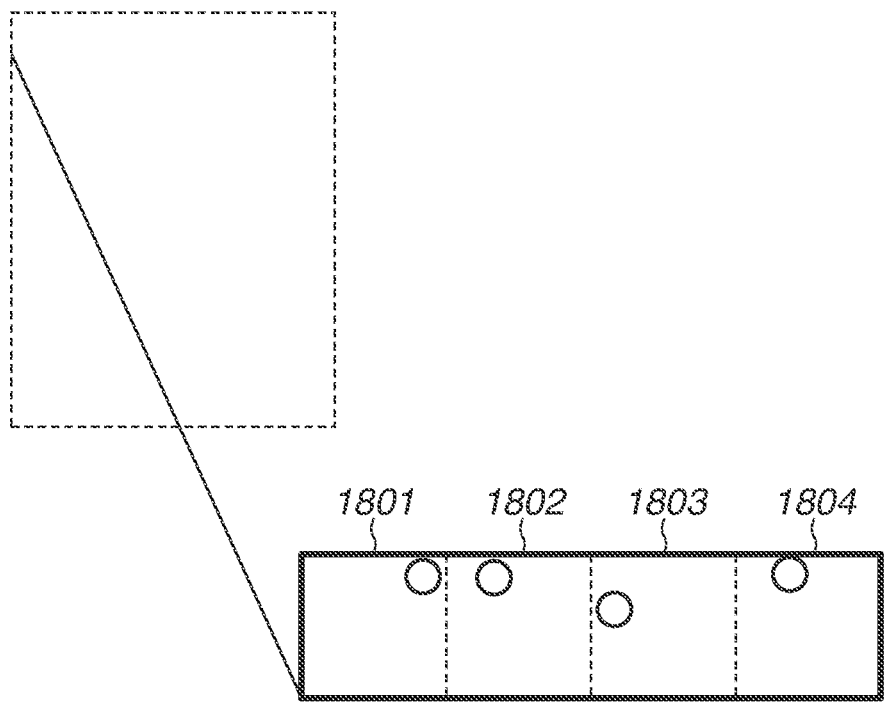

FIG. 18B is an imagery diagram illustrating, at an upper left portion thereof, image data to be printed on a paper document and, at a lower right portion thereof, four printing regions 1801 to 1804, as enlarged, each for printing one yellow dot, and a dot to be printed in each printing region is expressed by "o". Here, the printing region 1801 represents "3" in hexadecimal, the printing region 1802 represents "1" in hexadecimal, the printing region 1803 represents "4" in hexadecimal, and the printing region 1804 represents "1" in hexadecimal. While there are a number of methods for interpreting such additional information, here, two printing regions are assumed to represent one character and the first two numbers, i.e., "3" and "1", are assumed to represent character "1" (because 0x31 in ASCII (abbreviated from American Standard Code for Information Interchange) is a character string "1"). Subsequently, the next two numbers "4" and "1" are assumed to represent character "A" (because 0x41 in ASCII is a character string "A"). This way enables embedding additional information according to positions in which to embed dots. Moreover, as another method, there is a method of previously determining a standard for densities of yellow dots and changing densities according to additional information to be printed. Specifically, in a case where the standard density is set to "150", the method uses a dot of the density "151" for representing additional information "1" and uses a dot of the density "152" for representing additional information "2".

Using the above-described method enables, in S1509, generating image data to be printed with the document hash value and the tampering detection information integrated into one embedded image, thus being able to prevent a region with the document hash value embedded therein from being tampered.

Thus far is the description of the first exemplary embodiment and the second exemplary embodiment. As described above, in print processing, printing is performed with tampering detection information embedded in a paper document, and the embedded tampering detection information is registered with the blockchain apparatus 111 in association with the paper document. Then, in verification processing for a paper document, tampering detection information read from the paper document and tampering detection information registered with the blockchain apparatus 111 are compared with each other. This enables detecting any tampering in the content of the paper document.

Some embodiments can be implemented by performing processing for supplying a program which implements one or more functions of the above-described exemplary embodiments to a system or apparatus via a network or a storage medium and causing one or more processors included in the computer of the system or apparatus to read out and execute the program.

Moreover, some embodiments can also be implemented by using a circuit which implements such one or more functions (for example, an application specific integrated circuit (ASIC)).

According to aspects of the present disclosure, in an electronic document management system using a blockchain, not only proof of existence but also the presence or absence of a tampering becomes able to be verified at a time with respect to a paper document obtained by printing an electronic document.

This enables ensuring the completeness of a paper document.

Other Embodiments

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-187610, which was filed on Nov. 10, 2020 and which is hereby incorporated by reference herein in its entirety.

What is claimed is:

1. An image forming apparatus that cooperates with a management service which receives a document via a network and stores the document and a blockchain service which manages information about the document on a block-by-block basis and, upon defining association of each block with a previous and/or subsequent block, manages a plurality of blocks with a plurality of nodes, the image forming apparatus comprising:
a generation unit configured to, in printing a document stored in the management service, generate one or more embedded images based on existence proof information for confirming that information about a printed product of the document exists in the blockchain service and tampering detection information for confirming that there is no tampering in a printed product obtained by printing the document;
a registration unit configured to register the existence proof information and the tampering detection information with the blockchain service;
a printing unit configured to perform printing of the document with the one or more embedded images embedded therein; and
a control unit configured to, when verifying a printed product obtained by the printing unit, perform two verifications indicating that information about the printed product exists in the blockchain service and that there is no tampering in the printed product, by decoding the one or more embedded images included in the printed product to acquire the existence proof information and the tampering detection information and making an inquiry about the existence proof information and the tampering detection information registered in blocks of the blockchain service.

2. The image forming apparatus according to claim 1, wherein, when verifying a printed product obtained by the printing unit, in a case where the existence proof information acquired by decoding the one or more embedded images of the printed product has not been registered with the blockchain service, the control unit communicates information indicating that verification is impossible.

3. The image forming apparatus according to claim 1, wherein, when verifying a printed product obtained by the printing unit, in a case where the tampering detection information acquired by decoding the one or more embedded images of the printed product does not match the tampering detection information registered with the blockchain service, the control unit communicates information indicating that there is a tampering in the printed product.

4. The image forming apparatus according to claim 1,
wherein the generation unit generates two embedded images including a first embedded image corresponding to the existence proof information and a second embedded image corresponding to the tampering detection information, and
wherein at least the two embedded images generated by the generation unit are embedded in the document.

5. The image forming apparatus according to claim 4, wherein the first embedded image is a two-dimensional barcode, and the second embedded image is a dot group in which a plurality of dots are regularly arranged.

6. The image forming apparatus according to claim 4, wherein the existence proof information is a hash value concerning the document, and the tampering detection information is position information about dots unlikely to be viewed by a user.

7. The image forming apparatus according to claim 1,
wherein the generation unit combines the existence proof information and the tampering detection information into one piece of information and generates one embedded image from the one piece of information, and
wherein at least one embedded image generated by the generation unit is embedded in the document.

8. The image forming apparatus according to claim 1, wherein, in a case where there is a tampering in the printed product, the control unit communicates information indicating a portion at which there is a tampering in the printed product.

9. A control method for an image forming apparatus that cooperates with a management service which receives a document via a network and stores the document and a blockchain service which manages information about the document on a block-by-block basis and, upon defining association of each block with a previous and/or subsequent block, manages a plurality of blocks with a plurality of nodes, the control method comprising:
in printing a document stored in the management service, generating one or more embedded images based on existence proof information for confirming that information about a printed product of the document exists in the blockchain service and tampering detection information for confirming that there is no tampering in a printed product obtained by printing the document;
registering the existence proof information and the tampering detection information with the blockchain service;
performing printing of the document with the one or more embedded images embedded therein; and
when verifying a printed product obtained by the printing, performing two verifications indicating that information about the printed product exists in the blockchain service and that there is no tampering in the printed product, by decoding the one or more embedded images included in the printed product to acquire the existence proof information and the tampering detection information and making an inquiry about the existence proof information and the tampering detection information registered in blocks of the blockchain service.

10. A non-transitory computer-readable storage medium storing computer-executable instructions that, when executed by a computer, cause the computer to perform a control method for an image forming apparatus that cooperates with a management service which receives a document via a network and stores the document and a blockchain service which manages information about the document on a block-by-block basis and, upon defining association of each block with a previous and/or subsequent block, manages a plurality of blocks with a plurality of nodes, the control method comprising:
in printing a document stored in the management service, generating one or more embedded images based on existence proof information for confirming that information about a printed product of the document exists in the blockchain service and tampering detection information for confirming that there is no tampering in a printed product obtained by printing the document;
registering the existence proof information and the tampering detection information with the blockchain service;
performing printing of the document with the one or more embedded images embedded therein; and
when verifying a printed product obtained by the printing, performing two verifications indicating that information about the printed product exists in the blockchain service and that there is no tampering in the printed product, by decoding the one or more embedded images included in the printed product to acquire the existence proof information and the tampering detection information and making an inquiry about the existence proof information and the tampering detection information registered in blocks of the blockchain service.

* * * * *